United States Patent
Amine et al.

[11] Patent Number: 5,820,790
[45] Date of Patent: Oct. 13, 1998

[54] POSITIVE ELECTRODE FOR NON-AQUEOUS CELL

[75] Inventors: Khalil Amine; Hideo Yasuda; Yuko Fujita, all of Kyoto, Japan

[73] Assignee: Japan Storage Battery Co., Ltd., Kyoto, Japan

[21] Appl. No.: 555,230

[22] Filed: Nov. 8, 1995

[30] Foreign Application Priority Data

Nov. 11, 1994 [JP] Japan ..................................... 6-302914
Nov. 11, 1994 [JP] Japan ..................................... 6-302915

[51] Int. Cl.$^6$ .............................. H01B 1/08; H01M 4/50
[52] U.S. Cl. ...................... 252/519.1; 429/224; 423/599
[58] Field of Search .................................. 252/518, 521, 252/519.1; 429/218, 224; 423/599

[56] References Cited

U.S. PATENT DOCUMENTS

| | | | |
|---|---|---|---|
| 4,246,253 | 1/1981 | Hunter | 423/605 |
| 4,366,215 | 12/1982 | Coetzer et al. | 429/199 |
| 4,980,251 | 12/1990 | Thackeray et al. | 429/224 |
| 5,153,081 | 10/1992 | Thackeray et al. | 429/194 |
| 5,240,794 | 8/1993 | Thackeray et al. | 429/224 |
| 5,294,499 | 3/1994 | Furukawa et al. | 429/164 |
| 5,316,877 | 5/1994 | Thackeray | 429/197 |
| 5,425,932 | 6/1995 | Tarascon | 423/599 |
| 5,449,577 | 9/1995 | Dahn et al. | 429/94 |
| 5,591,546 | 1/1997 | Nagaura | 429/218 |

FOREIGN PATENT DOCUMENTS

| | | |
|---|---|---|
| 2 221 213 | 1/1990 | United Kingdom . |
| 2 276 155 | 9/1994 | United Kingdom . |
| 2276155 | 9/1994 | United Kingdom . |

OTHER PUBLICATIONS

Huang et al "A 3 Volt Lithium Manganose Oxide Cathode . . . " J. Electrochem. Soc., vol. 141, No. 7, Jul. 1994 pp. L76–L77.
Macklin et al. "Performance of Lithium–Manganese Oxide Spinel Electrodes . . . " Journal of Power Sources, 34 (1991) pp. 39–49 (No Month Available).
Journal of Power Sources, 41 (1993) 305–314.
Solid State Ionics 69 (1994) 59–67.
Journal of Solid State Chemistry 94, 185–196 (1991).
J. Electrochem. Soc., vol. 141, No. 9, pp. L106–L107, Sep. 1994.
Mat. Res. Bull., vol. 18, pp. 461,472, 1983.
J. Electrochem. Soc., vol. 141, No. 6, pp. 1421–1431, Jun. 1994.
Denki Kagaku 58, No. 5 (1990), pp. 477–478 and partial translation thereof.
Denki Kagaku 59, No. 7 (1991), pp. 626–627 and partial translation thereof.
Battery Technology Committee Materials of the Electrochemical Society of Japan No. 6–9 (1994), pp. 1–7 and partial translation thereof.

*Primary Examiner*—Mark Kopec
*Attorney, Agent, or Firm*—Armstrong, Westerman, Hattori, McLeland & Naughton

[57] ABSTRACT

A positive active material for a non-aqueous cell comprising a lithium-manganese composite oxide having an oxygen-defect type spinel structure and its preparing process are disclosed. A cell comprising the positive active material for a non-aqueous cell has excellent properties with high discharge capacity, a monotonous variation of the potential without flection during both charging and discharging, and very limited loss of the electric capacity upon charging and discharging.

6 Claims, 20 Drawing Sheets

POSITIVE ELECTRODE FOR NON-AQUEOUS CELL

BACKGROUND OF THE INVENTION

The present invention relates to a positive active material for a non-aqueous cell and its preparing process, and more particularly to a positive active material composed of lithium-manganese composite oxide, which can be used in a non-aqueous cell such as a non-aqueous lithium cell and its preparing process.

In recent years, new cells having a high efficiency have been developed in accordance with the miniaturizing and lightening of electronic equipment Under these circumstances, a lithium cell having a high energy density has attracted more interest. As a lithium primary cell, there have been known a lithium-manganese dioxide cell, lithium-carbon fluoride cell and the like. Also, as a lithium secondary cell, there have been known, a lithium-manganese dioxide cell, a lithium-vanadium oxide cell and the like.

In the secondary cell where lithium is a negative electrode, a defect related to the internal growth in a form of dendritic growth of metallic lithium takes place. Thereby, the cycle life of the cell is shortened. Also, the handling of metallic lithium is very difficult because of its high reactivity. Thereby, serious problems in safety are raised. In order to obviate the above inconveniences, a lithium ion cell having a negative electrode made of graphite or carbon and a positive electrode made of lithium cobalt oxide or lithium nickel oxide has been developed and used as a cell having a high energy density.

Among positive active materials which could be used in a cell having a high energy density, the spinel manganese oxide is a strong candidate since it presents several advantages related to safely handling of the cell and more important low cost of the raw material when compared with lithium cobalt oxide or lithium nickel oxide. Accordingly, the research and development for applying the spinel manganese oxide to a cell having a high efficiency have been intensively proceeded. In recent years, it becomes clear that the lithium-manganese composite oxide having a spinel structure shows higher potential than manganese dioxide, and nearly equal potential to that of lithium nickel oxide and lithium cobalt oxide. The investigation of the synthetic process of the lithium-manganese composite oxide having a spinel structure has not yet been very sufficient although various methods for preparing the lithium-manganese composite oxide having a spinel structure have been proposed.

For instance, U.S. Pat. No. 4,980,251 discloses a compound having a spinel structure represented by the general formula:

$$Li_{1-x}Mn_2O_4$$

wherein $0 \leq x < 1$, produced by mixing $MnCO_3$ with $Li_2CO_3$ and heating the mixture at 200° to 600° C. in an oxidative atmosphere such as air.

U.S. Pat. No. 4,366,215 discloses a compound represented by the general formula:

$$AB_2O_4$$

wherein B is a transition metal which could be a divalent, trivalent or tetravalent cation of a metal selected from titanium, vanadium, chrominium, manganese, iron, cobalt, nickel, copper, zinc, magnesium and aluminum.

U.S. Pat. No. 4,366,215 and U.S. Pat. No. 5,240,794 disclose the applicable composition of lithium-manganese oxide derived from the phase diagram of Li—Mn—O. U.S. Pat. No. 5,153,081 discloses a compound represented by the general formula:

$$A_{2-2x}MnO_{3-x}$$

wherein A is lithium ion or an admixture of lithium ion and hydrogen ion and, $0 \leq x \leq 1$.

Journal of Power Sources, 41, 305 (1993) discloses a process of reacting chemically synthesized manganese dioxide with $LiNO_x$ or $Li_2CO_3$, at 350° to 550° C. and then further heating the mixture at 650° to 750° C. for 75 to 200 hours to obtain electrochemical active $LiMn_2O_4$.

Battery Technology Committee Materials of the Electrochemical Society of Japan No. 6-9 (1994) discloses that a homogeneous lithium-manganese oxide is obtained by soaking $LiNO_3$ in manganese dioxide at a melting temperature of $LiNO_3$ of 264° C. during the reaction of manganese dioxide with $LiNO_3$.

Solid State Ionics, 69, 59 (1994) discloses that a compound represented by the general formula:

$$Li_xMn_2O_4$$

wherein $0 < x \leq 1$ is synthesized by preheating $LiOH \cdot H_2O$ and $\gamma$-$MnO_2$ at 450° C. and then reacting the mixture at 650° C., and that lithium-manganese oxide doped with magnesium or zinc ion could be obtained by using $Mg(NO_3)_2 \cdot 6H_2O$ or $Zn(NO_3)_2 \cdot 2H_2O$ during the mixing process, and by preheating the overall mixture at 450° C. before further increasing the temperature to 650° C. This process leads to the increase of the cell capacity and the improvement of the cyclic reversibility upon charging and discharging.

Master. Res. Soc. Symp. Proc. 293, 39 (1993) discloses a compound represented by the general formula:

$$Li_xMn_2O_4$$

wherein $0 < x \leq 2$ in which a titanium ion is contained.

J. Electrochem. Soc., 141, 1421 (1994) discloses a compound represented by the general formula:

$$Li_xMn_2O_4$$

wherein $0 < x \leq 2$, which is obtained by mixing $MnO_2$ with $Li_2CO_3$ or $LiNO_3$, heating the resulting mixture at 800° C. in air, pulverizing and then annealing the resulting powder under the same heating conditions as mentioned above.

Mat. Res. Bull., 18, 461 (1983) discloses that $LiMn_2O_4$ is obtained by mixing $Mn_2O_3$ with $Li_2CO_3$, preheating the resulting mixture at 650° C. in air before further increasing the heating temperature to 850° C. Also, $Li_xMn_3O_4$ and $Li_{1+x}Mn_2O_4$ materials were found to be prepared by chemically inserting lithium comprising reacting $Mn_3O_4$ or $LiMn_2O_4$ with excessive n-butyl-lithium dissolved in hexane at 50° C. for several days in nitrogen gas atmosphere, at the end of the reaction, the materials were filtered and washed with hexane before being dried under vacuum.

Denki Kagaku 58, 477 (1990) discloses the result of the reaction of $MnO_2$ with $LiNO_3$, and reports that when the heating temperature is over 500° C., the presence of a $LiMn_2O_4$ enriched phase is distinctly detected, but when testing the cell with this $LiMn_2O_4$ as an active material, the discharge capacity rapidly decreased during the first 20 cycles. Moreover, it is reported that when the heating temperature is lower than 500° C., a $LiMn_3O_4$ enriched product which is not suitable as a positive active material is formed. In this case, it is reported that the electrochemical activity is lowered when $LiMn_2O_4$ is contained therein.

Denki Kagaku 59, 626 (1991) discloses the influence of the synthesizing temperature when using $MnO_2$ and $LiNO_3$ as starting precursors. According to the document, mainly $LiMn_3O_6$ is formed when the synthesizing temperature is around 350° C. Whereas, at more higher temperature, the spinel $LiMn2O_4$ is obtained.

Thus, although various compositions of lithium-manganese composite oxides as well as their preparation processes have been investigated, the appropriate composition of a lithium-manganese composite oxide which is most suitable for a highly active material and a detail study of its electrochemical properties have not yet been sufficiently known. It reveals that when a lithium-manganese composite oxide is synthesized at a low temperature such as at most 500° C., it is difficult to prepare a pure lithium-manganese composite oxide with a large surface area since impurities such as $Mn_2O_3$ are contained therein.

Recently, another method different from the solid state reaction has been proposed. This method comprises mixing a manganese based material with a lithium salt and the like in a state of solution, filtering and heating the resulting mixture to synthesize a lithium-manganese composite oxide.

For instance, Journal of Solid State Chemistry, 94, 185 (1991) discloses a so-called sol-gel method comprising mixing manganese (II) acetate dissolved in an aqueous solution of gelatin with an aqueous solution of LiOH and heating the resulting mixture in an inert atmosphere. Journal of Electrochemical Society, 141, L106 (1994) discloses that a lithium-manganese composite oxide was synthesized by adding manganese (II) acetate to a solution of $Li_2CO_3$ dissolved in distilled water, the solution was mixed with vigorous stirring, and the residual water was evaporated at 85° C. The dried material was heated at 600° C. in air. The resulting material which was identified by means of X-ray diffraction analysis, was reported to be $LiMn_2O_4$. This material shows a high rate discharge performance and good cyclic reversibility.

Thus, a synthetic method using not a solid-phase reaction but a liquid-phase reaction has been initiated, but there are a few reports on the detail product formation using the liquid-phase reaction.

As stated above, the reason why the lithium-manganese composite oxide has not yet been put to practical use is because of its limited reversibility during charging and discharging processes, the dramatic decrease of its capacity upon cycling, and the inferior performance of its high rate charge and discharge when compared with those of lithium cobalt oxide or lithium nickel oxide which present a layered structure.

The reason is thought to be based upon the fact that the lithium-manganese composite oxide such as $LiMn_2O_4$ has a spinel structure, thereby lithium ion can be hardly diffused uniformly during charge and discharge. Moreover, the second reason is that a method for preparing a homogeneous lithium-manganese oxide or a lithium-manganese composite oxide having a large surface area has not yet been well established.

Accordingly, it has been earnestly desired to develop a method for preparing a lithium-manganese composite oxide having a high activity.

An object of the present invention is to provide a positive active material which can be used in a non-aqueous cell where the capacity does not decrease dramatically when the cell is repeatedly charged and discharged.

Another object of the present invention is to provide a positive active material which can be used in a non-aqueous cell with its potential varying in monotonous way during the charge and discharge processes in contrast to the conventional spinel where two plateaus at 4.1 and 3.9 V are usually observed in the charge and discharge curves.

These and other objects of the present invention will become apparent from the description hereinafter.

SUMMARY OF THE INVENTION

In accordance with the present invention, herein is provided a positive active material for use in a non-aqueous cell, comprising a lithium-manganese composite oxide having an oxygen-defect type spinel structure.

Also, there is provided a process for preparing a positive active material which can be used in a non-aqueous cell, comprising an oxygen defect lithium-manganese composite oxide spinel, prepared by mixing less than 1 mole of a lithium salt or lithium hydroxide with 2 moles of manganese dioxide, pressurizing the resulting mixture at a pressure of at least 300 $kg/cm^2$ to give a pellet, and then heating and pulverizing the pellet.

Furthermore, a process is provided for preparing a positive active material which can be used in a non-aqueous cell, comprising an oxygen defect lithium-manganese composite oxide spinel prepared by the sol-gel process by mixing a manganese-based organic acid salt, lithium nitrate salt, and a sol-stabilizing agent in an aqueous alkaline solution, and heating the resulting material after the filtration and drying process.

DETAILED DESCRIPTION

Figure 1:
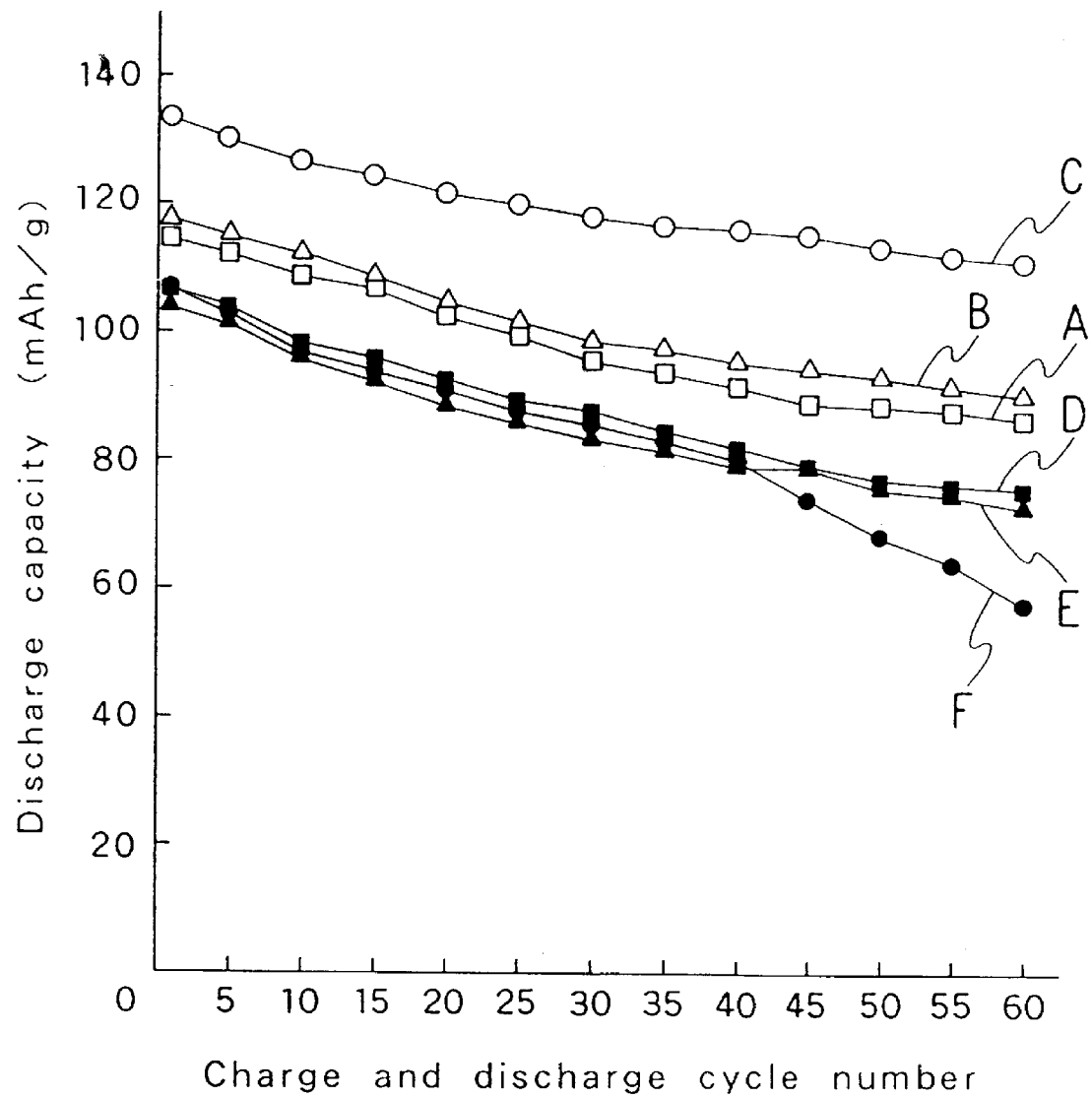
FIG. 1 is a graph showing the charge and the discharge capacity of a cell having a positive electrode according to the present invention and a conventional positive electrode during the charge and discharge processes.

According to the conventional methods for preparing a lithium-manganese composite oxide, the obtained material is not usually homogeneous. The reason is thought to be based on the difficulty to uniformly carry out the formation reaction of the composite oxide specially at a low temperature, thereby impurities such as $Mn_2O_3$ and $Li_2MnO_3$ are generated, and that unreacted $MnO_2$ is incorporated into the final product with the obtained material presenting small surface area.

In order to solve the above problem, a detail investigation of different preparation processes of the spinel lithium-manganese composite oxide has been carried out. As a result, when employing not only a conventional method using merely a mixture of the starting materials, but also a method which consists of firstly pressurizing the mixture of the starting materials and then heating and pulverizing the pressurized pellet at the same time. It has been found that the reaction is uniformly carried out in the temperature range between 300° and 600° C., thereby the decrease of the surface area of the obtained product due to the particle coagulation can be minimized.

Furthermore, when lithium nitrate which shows a molten state at a low temperature is mixed with manganese dioxide using the above method and heating at a low temperature, a pure and highly homogeneous lithium-manganese composite oxide with a large surface area is obtained, specifically when preparing a spinel with lithium deficiency using less than one mole of a lithium salt per two moles of manganese-based material which could be either manganese dioxide or manganese carbonate or the like.

Also, another preparation method has been investigated based on the solution reaction by mixing an organic acid salt of manganese such as manganese acetate or manganese acetylacetonate and lithium nitrate as a lithium salt in an aqueous solution.

As a result, when the organic acid salt of manganese is mixed with the lithium salt to obtain a mixture at the molecular level, only an aqueous ammonia is added to the resulting mixture to give an immediate precipitation. The precipitate is modified to a gel by filtration and drying before being subjected to a heat treatment at a low temperature such as about 250° C. The obtained material is not an aimed lithium-manganese composite oxide but $Mn_2O_3$. Thereupon, gelatin is selected as a sol-stabilizing agent, and the conditions for preparing a pure lithium-manganese composite oxide has been studied. As a result, when the amount of gelatin is adjusted to 7 to 20% by weight based on the total amount of the manganese-based organic acid salt such as manganese acetate, the lithium salt or lithium hydroxide and gelatin, it is found that a pure lithium-manganese composite oxide can be synthesized.

Furthermore, a lithium-manganese composite oxide can be prepared by dissolving an organic acid salt of manganese and a lithium salt such as lithium nitrate in an organic solvent such as ethyl alcohol and mixing the resulting solutions with a sol-stabilizing agent such as carbon black powder or graphite powder which is previously dispersed in the same organic solvent as the above. In this case, a lithium-manganese composite oxide could be obtained using 0.1% or higher of carbon amount. This technique has an industrial advantage since the obtained gel could be coated very easily on a conducting material made of titanium or copper, and could be used directly as electrode in a cell after the heat treatment and the formation of the spinel lithium-manganese composite oxide. In this case, no organic binder will be needed, and the existing carbon used as a stabilizing agent could assure the electrical conductivity of the active material. Furthermore, since the lithium-manganese composite oxide of the present invention can be obtained by the reaction of starting materials at a low temperature, the resulting lithium-manganese composite oxide presents a larger surface area which leads to the increase of surface lithium active site, a more homogeneous phase and a higher electrochemical activity.

A lithium-manganese composite oxide having a spinel structure with a formula: $LiMn_2O_4$ is generally prepared by reacting manganese dioxide or manganese carbonate with lithium carbonate. Its reaction is as follows:

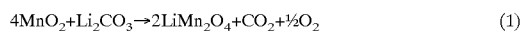
$$4MnO_2 + Li_2CO_3 \rightarrow 2LiMn_2O_4 + CO_2 + \tfrac{1}{2}O_2 \tag{1}$$

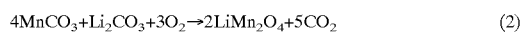
$$4MnCO_3 + Li_2CO_3 + 3O_2 \rightarrow 2LiMn_2O_4 + 5CO_2 \tag{2}$$

When $LiMn_2O_4$ is obtained by a conventional method by just mixing the starting precursors, an atmosphere of air is used, and the starting materials of the reactions (1) and (2) are heated at a low temperature such as at least 500° C. for a long period of time in order to complete the reaction. However, the resulting reaction product contains substantial amount of $Li_2MnCO_3$ or $Mn_2CO_3$ mixed with $LiMn_2O_4$, and moreover phases having different lattice constants are formed.

Whereas, when manganese dioxide or manganese carbonate is mixed with lithium carbonate and then the resulting mixture is pressurized at a pressure of at least 300 kg/cm² to give a pellet in order to increase the contact area of particles, after the pellet is heated at a low temperature in the range of 300° to 600° C. and pulverized again, the generation of $Mn_2O_3$ and $Li_2MnO_3$ can be remarkably avoided. Furthermore, a highly homogeneous spinel material could be obtained with one uniform lattice constant, thereby its electrochemical performances can be improved. This effect is based upon the formation of an oxygen-defect lithium-manganese composite oxide with a slight excess of oxygen in the spinel structure according to the following formulation:

$$LiMn_2O_{4+\epsilon}$$

wherein $0<\epsilon<0.5$.

In this case, the material has lower unit cell parameter compared with the stoichiometric spinel with the result of both ion chromatography and atomic absorption giving a 1 to 2 ratio between lithium and manganese. The overall average oxidation state of manganese is slightly higher than 3.5 with more smaller tetravalent manganese existing in the spinel, thereby explaining the decrease in the unit cell parameter.

Furthermore, when a lithium nitrate which is molten at a low temperature is used as a lithium salt, the following reaction occurs.

$$2MnO_2 + LiNO_3 \rightarrow LiMn_2O_4 + NO_2 + \tfrac{1}{2}O_2 \qquad (3)$$

In this case, when the heating temperature is adjusted to a temperature lower than the decomposition of the lithium salt, for instance, less than 700° C., impurities such as $Mn_2O_3$ and $Li_2MnO_3$ are coexisted with $LiMn_2O_4$, and moreover phases with different lattice constants are coexisted. Therefore, the electrochemical performances of the obtained material are badly affected. However, when $MnO_2$ and $LiNO_3$ are previously pressurized and then heated, the generation of $Mn_2O_3$ and $Li_2MnO_3$ can be avoided. Furthermore, when $MnO_2$ and $LiNO_3$ are previously pressurized and then heated at a temperature of at least the melting point of $LiNO_3$ of 261° C. and at most 600° C. which is close to the decomposition temperature of $LiNO_3$, the resulting product contains $Mn_2O_3$ impurities, but has a smaller particle size and therefore a larger surface area. In this case, the discharge capacity of the cell is also affected by the presence of impurities. An effective method for restraining the formation of $Mn_2O_3$ is the preparation of lithium-manganese composite oxide having a deficiency in lithium as represented by the general formula:

$$Li_xMn_2O_4$$

wherein $0<x<1$. The restrain of the formation of impurities is remarkably occurred when the above x is adjusted to $0<x\leq 0.95$, even though the use of $LiNO_3$ which generates impurities in a large amount, $Mn_2O_3$ is hardly contained in the product, and the electrochemical performances of the material are improved. Also, the decrease of the discharge capacity upon cycling is restrained.

When $LiNO_3$ is used during the preparation of a lithium-manganese composite oxide having lithium-deficiency represented by the general formula:

$$Li_xMn_2O_4$$

wherein $0<x<1$, at a temperature of at least the melting point of $LiNO_3$, which is 261° C. and at most its decomposition point of 600° C., if a process comprising further pressurizing and reheating the mixed precursors several times, not only $MnO_3$ is completely removed from the resulting material but also a highly homogeneous material with a large surface area can be obtained, thereby its electrochemical properties become extremely excellent.

When the thus obtained pure lithium-manganese composite oxide having an oxygen-defect type spinel prepared by the sol-gel process or the low temperature solid state reaction using $Li_3CO_3$; or a spinel with a lithium deficiency prepared by the $LiNO_3$ at low temperature is used as an electrode in a cell, a very good performances are revealed during the charge and discharge processes. That is, when the electrodes according to the present invention are used, one continuous charge and discharge plateau with a monotonous variation of the potential versus capacity is exhibited in contrast to the conventionally known lithium-manganese composite oxide having a spinel structure which shows two charging and discharging plateaus in the vicinity of 4.1 V (vs. $Li/Li^+$) and 3.9 V (vs. $Li/Li^+$). This is thought to be based upon the occurrence of one phase reaction during the extraction and intercalation of lithium upon charging and discharging the cell, behavior completely different from the reported two phase reactions in the spinel prepared by the conventional processes.

When applying a sol-gel method according to the present invention, comprising preparing a solution of an organic acid salt of manganese such as manganese acetate, and a lithium salt such as lithium nitrate and reacting the solution with an aqueous alkaline solution such as aqueous ammonia, $LiMn_2(CH_3COO)_3(OH)_2$ is generated in the process of formation of the gel from the sol. When the resulting gel is subjected to a heat treatment, the following reaction occurs.

$$LiMn_2(CH_3COO)_3(OH)_2 + \tfrac{27}{2} O_2 \rightarrow LiMn_2O_4 + \tfrac{11}{2} H_2O + 6CO_2 \qquad (4)$$

The functions and effects exhibited by the sol-stabilizing agent have not yet been completely clarified. However, it is considered that the sol-stabilizing agent prevents the transformation of an organic acid salt of divalent manganese [Mn(+II)] to $Mn(OH)_2$ during the dissolution in water and the like. When the stabilizing agent is not used, $Mn(OH)_2$ is probably generated, causing the formation of $Mn_2O_3$ after the heat treatment of the gel. As a sol-stabilizing agent, it is desired to use carbon black or graphite particles instead of gelatin which has been conventionally used because carbon particles exhibit a good electrical conductivity. In such a case, when an organic solvent such as ethyl alcohol is used as a dispersion medium instead of water, the resulting paste can be coated very easily on a conducting material made of titanium or copper and then dried and heated at a low temperature to give an active material containing carbon conductor, thereby making it very suitable to be used directly as an electrode for a cell with the industrial advantage of eliminating the cost of the organic binder used usually in the preparation of the electrode. Furthermore, since the lithium-manganese composite oxide is prepared at a low temperature, the surface area of the obtained material is very large and since the mixing process of the precursors is conducted in the solution, a highly homogeneous phase is then generated, thereby the electrochemical performances of the obtained material are greatly enhanced.

The positive active material for non-aqueous cells of the present invention comprises lithium-manganese composite oxide having also an oxygen-defect type spinel since it exhibits a low unit cell parameter compared with the stoichiometric spinel and since the ratio between lithium and manganese in the material is 1 lithium for 2 manganese as observed by both ion chromatography and atomic absorption.

For the material prepared by the solid state reaction at a low temperature using a mixture of chemically prepared manganese dioxide and either $Li_2CO_3$, $LiOH$ or $LiNO_3$, it is preferable to consider a lithium deficiency during the preparation process specially in the case of using the lithium nitrate. In this case, at most 1 mole per 2 moles of manganese contained in manganese dioxide has to be considered in order to obtain a pure lithium-manganese composite oxide with lithium-deficiency without any contamination from manganese-based impurities. Also, it is desired that the amount of the lithium is at least 0.85 mole, particularly at least 0.9 mole per 2 moles of the manganese.

The above mixture of manganese dioxide, and the lithium salt or lithium hydroxide is pressurized at a pressure of at least 300 kg/cm$^2$. When the pressure is lower than 300 kg/cm$^2$, the pressurization is insufficient and handling becomes worse. Also, in order to easily pulverize a resulting molded material after heating, it is desired that the pressure is at most 2000 kg/cm$^2$, particularly at most 1000 kg/cm$^2$.

Then, the pressurized mixture is subjected to a heating treatment. The heating treatment can be usually carried out in air. It is desired that the heating temperature is at least 200° C., particularly at least 400° C. in order to give a product having a spinel structure. Also, it is desired that the heat temperature is at most 700° C., particularly at most 600° C. in order to obtain a material with a large specific surface area and decrease the cost induced by the high heat treatment.

In the present invention, it is desired that a process comprising repressurizing and reheating the resulting product is repeated at least one time from the viewpoint of preparation of a homogeneous lithium-manganese composite oxide without the presence of any impurities.

After the heat treatment, the resulting product is pulverized to give a positive active material of thus present invention. It is desired that the active material is pulverized so that its average particle diameter is ranged between 0.01 to 3 μm, particularly 0.2 to 1.5 μm.

Also, according to the process for preparing a positive active material for a non-aqueous cell of the present invention, a lithium-manganese composite oxide used as a positive active material is obtained by preparing a sol with a solution of an organic acid salt of manganese, a solution of a lithium salt or lithium hydroxide, a sol-stabilizing agent and an aqueous alkaline solution, and heating the resulting sol.

Typical examples of the above organic acid salt of manganese are, for instance, manganese acetate, manganese acetylacetonate, manganese citrate, manganese oxalate, manganese formate, manganese lactate and the like. These acid salts of manganese can be used alone or in an admixture thereof.

Typical examples of the above lithium salt are, for instance, lithium carbonate, lithium nitrate, lithium sulfate, lithium chloride, lithium acetate, lithium oxalate, lithium citrate and the like. These lithium salts can be used alone or in an admixture thereof.

Typical examples of the solvent used for dissolving the above organic acid salt of manganese are, for instance, water, alcohols such as methyl alcohol and ethyl alcohol. These solvents can be usually used alone or in an admixture thereof.

The concentrations of the organic acid salt of manganese in the above manganese organic acid salt solution is not particularly limited. However, it is usually desired that the concentration of the organic acid salt of manganese is 3 to 30 w/v %.

Typical examples of the solvent used in the lithium salt or lithium hydroxide solution are, for instance, water, alcohols such as methyl alcohol and ethyl alcohol. These solvents can be usually used alone or in an admixture thereof.

The concentration of the lithium salt or lithium hydroxide in the above lithium salt or lithium hydroxide solution is not particularly limited. However, it is usually desired that the concentration of the lithium salt or lithium hydroxide is 3 to 30 w/v %.

Typical examples of the above sol-stabilizing agent are, for instance, gelatin, carbon black, graphite, polyvinyl alcohol, methyl cellulose, hydroxyethyl cellulose and the like. These sol-stabilizing agents can be used alone or in an admixture thereof.

Typical examples of the above aqueous alkaline solution are, for instance, aqueous ammonia, aqueous sodium hydroxide solution and the like. These aqueous alkaline solutions can be used alone or in an admixture thereof.

After the organic acid salt of manganese solution, the lithium salt or lithium hydroxide solution, the sol-stabilizing agent and the aqueous alkaline solution are mixed together to give a sol and the resulting sol is heated. Previous to the heat treatment, the resulting sol can be dried, for instance, by rotary evaporating technique under limited vacuum to obtain a gel material. The gel material can be then heated in air. The heating temperature can be 200° to 750° C. or so, and the heating time can be 5 to 48 hours or so.

Thus, a positive active material can be obtained.

The present invention is more specifically described and explained by means of the following examples. It is to be understood that the present invention is not limited to the examples and various changes and modifications may be made in the present invention without departing from the spirit and the scope thereof.

EXAMPLE 1

After chemically prepared manganese dioxide powder having an average particle diameter of 5 μm was mixed with lithium carbonate powder having an average particle diameter of 10 μm in a 4:1 molar ratio between the manganese dioxide and the lithium carbonate, the obtained mixture was pelletized under a pressure of 1000 kg/cm$^2$, the resulting pellet was heated at 850° C., 750° C. or 450° C. for 48 hours in an atmosphere of air and allowed to cool down to room temperature before being pulverized, to give a lithium-manganese composite oxide.

Then, an electrode was made by mixing 87% by weight of the lithium-manganese composite oxide as the active material, 5% by weight of carbon black as the electric conductor, 5% by weight of polyvinylidene fluoride as the binder and 3% by weight of N-methyl-2-pyrrolidone in a dry chamber to obtain paste. The paste was coated on a titanium net which serves as a current collector and then dried at 80° C. for 1 hour to give a positive electrode material having a length of mm, a width of 25 mm and a thickness of 0.25 mm (content of the lithium-manganese composite oxide: 91 mg, theoretical capacity: 13.5 mAh). The spinel positive active material prepared at temperatures of 850° C., 750° C. and 450° C. are denoted as (A), (B) and (C), respectively.

A test cell was constructed using a glass cell type comprising the active material as a positive electrode, a lithium metal plate as a counter electrode, a lithium reference and 50 ml of electrolyte composed of 1M of lithium perchlorate dissolved in ethylene carbonate and diethyl carbonate solvents in a volume ratio of 1:1. A cycle test was conducted by charging the test cell up to 4.3 V at a current density of 0.5 mA/cm$^2$ at room temperature and then discharging it down to 2.5 V at the same current density of 0.5 mA/cm$^2$.

The variation of the capacity of the test cell per unit weight of the active material upon repeated cycling is shown in FIG. 1.

As reference materials for comparison, conventional lithium-manganese composite oxides were prepared by merely mixing manganese dioxide powder with lithium carbonate powder in a 4:1 molar ratio of manganese dioxide to lithium carbonate without pressurizing. The conventional positive electrode material prepared without previous pressurization at the temperatures of 850° C., 750° C. and 450° C. are referred to as (D), (E) and (F), respectively. The same processes for preparing and testing the electrodes (A), (B) and (C) were applied to the electrode (D), (E) and (F). The test results are shown in FIG. 1.

From the results shown in FIG. 1, it can be seen that the discharge capacity of the test cell in which the positive electrode (A), (B) or (C) was used, was higher than that of the test cell in which the conventional positive electrode (D), (E) or (F) was used.

Furthermore, it can be seen that the decrease of the discharge capacity upon cycling of the cell with (A), (B) or (C) electrode is smaller than that of the test cell with (D), (E) or (F) electrode.

An X-ray diffraction analysis of each active material was carried out to examine the reason why the test cells according to the present invention have higher discharge capacity and limited loss in the capacity upon cycling. The results are shown in FIG. 2.

Figure 2:
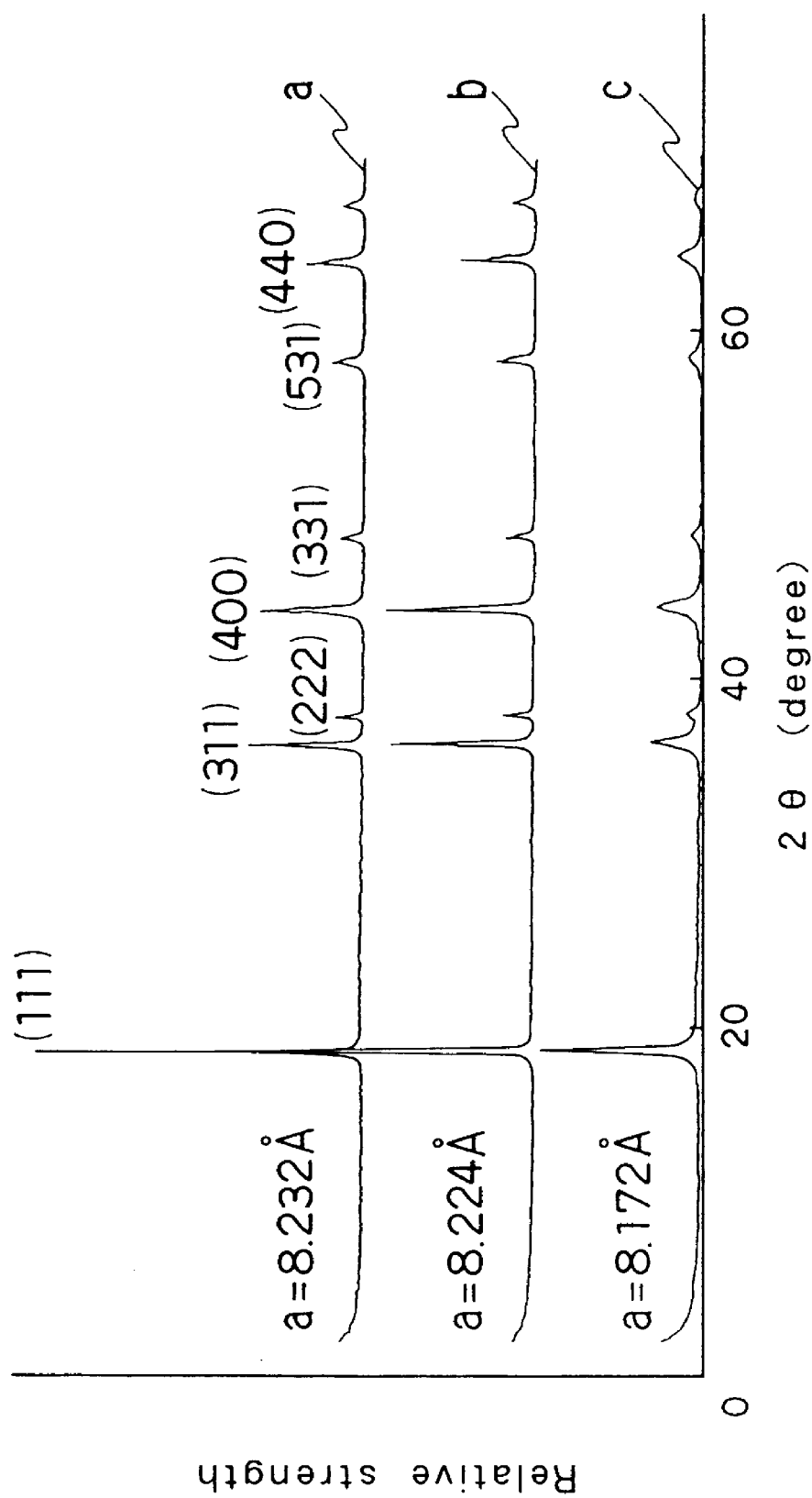
FIG. 2 represents X-ray diffraction patterns of a spinel material prepared at 850° C., 750° C. or 450° C. of the present invention.

From the results shown in FIG. 2, it can be seen that the active material of the present invention has a single phase of $LiMn_2O_4$ and does not contain impurities such as $Mn_2O_3$. Furthermore, the fact of pelletizing the mixture of the starting material leads to the increase in the particle surface contact of the precursors inducing thus a highly uniform resulting material. In contrast, the preparation of the spinel using the conventional methods leads to less uniform product with the presence of impurities such as $Mn_2O_3$ specially at a low temperature preparation.

The reason why the positive electrode according to the present invention shows good electrochemical performances is assumed to be due to the fact that the active material of the present invention has a single phase of $LiMn_2O_4$ and thereby, a homogeneous phase reaction occurs during the charge and discharge processes. When the surface of the electrodes was analyzed after performing 100 cycles, it was confirmed that shedding of the active material was not observed on the surface of the electrodes obtained in the present invention, whereas, the shedding effect was observed on the surface of the conventional electrodes.

Accordingly, when manganese dioxide powder is mixed with lithium carbonate powder and then the resulting mixture is pressurized, the resulting materials present a higher discharge capacity and a very good cyclic reversibility.

The process of mixing and then pressurizing has been generally employed in the preparation of a superconducting material and the like. When this process is applied to the synthesis of the lithium-manganese composite oxide which is used as an active material for a cell, its effect on the resulting materials are excellent since it leads to the formation of a uniform and highly active material.

Moreover, the electrode (C) which is prepared at a low temperature such as 450° C. according to the present invention has higher discharge capacity and better cyclic reversibility in comparison with the electrode (A) or (B) which is prepared at a temperature of 850° C. or 750° C., respectively.

In order to investigate the reason behind the observed differences in the electrochemical performances of the above materials, the unit cell parameter of the active materials (a), (b) and (c) was deduced from the X-ray diffraction patterns shown in FIG. 2 and then compared. As a result, the unit cell parameters of the active materials (a), (b) and (c) were 8.232 angstrom, 8.224 angstrom and 8.142 angstrom, respectively. Therefore, lowering the preparation temperature leads to the decrease of the unit cell parameters of the obtained materials.

Figure 3:
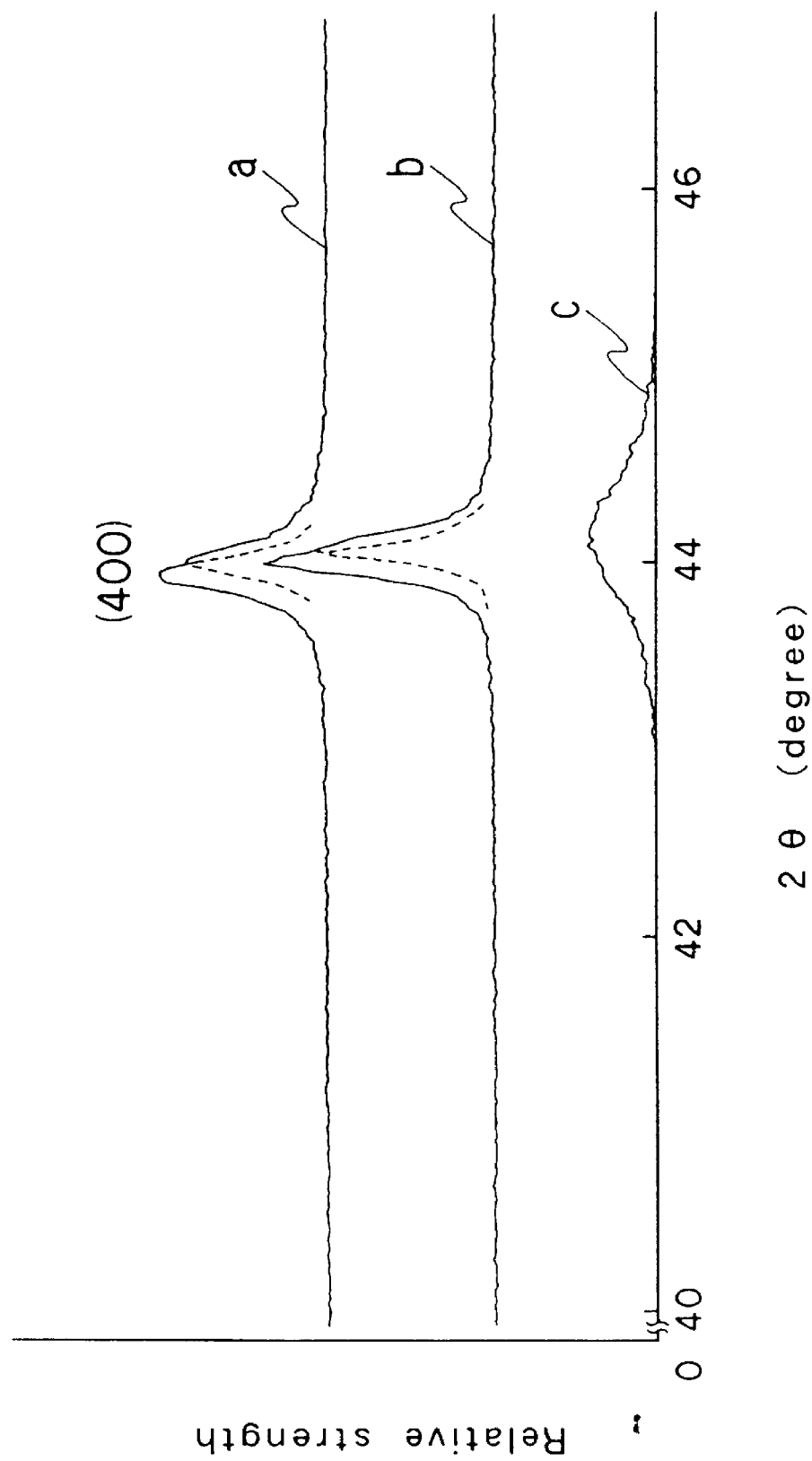
FIG. 3 is a zoom of X-ray diffraction patterns of FIG. 2 at the portion corresponding to the peak (400).

The zoom of the X-ray diffraction patterns at the area corresponding to the peak (400) is shown in FIG. 3. The peak (400) observed in the active materials (a) and (b) are very sharp revealing that the material is well crystallized with most of the particles coagulating. The observed (400) peaks could be divided into two peaks, indicating probably the presence of two phases in the obtained $LiMn_2O_4$ spinel. As to the active material (c), since the diffraction pattern corresponding to the peak (400) is broad and symmetrical, it is thought that a uniform single phase having a large surface area is formed.

Thereupon, the particle size distribution of the materials prepared at different temperatures was examined by means of a scanning electron microscopy (SEM). The results are shown in FIG. 4 and FIG. 5.

Figure 4:
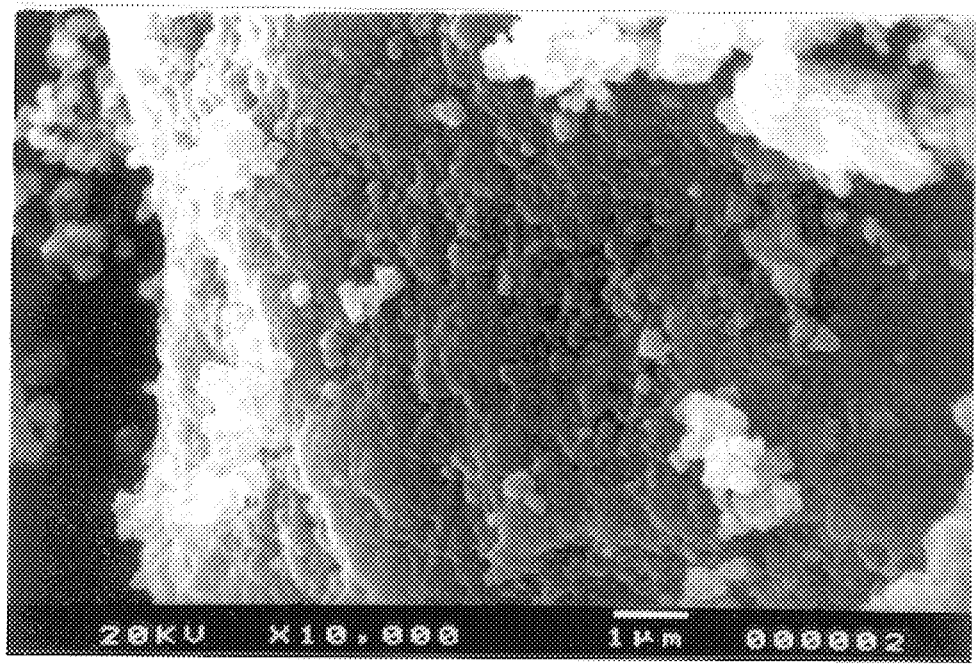
FIG. 4 is a SEM photograph showing the average particle size of the spinel obtained at 750° C.
Figure 5:
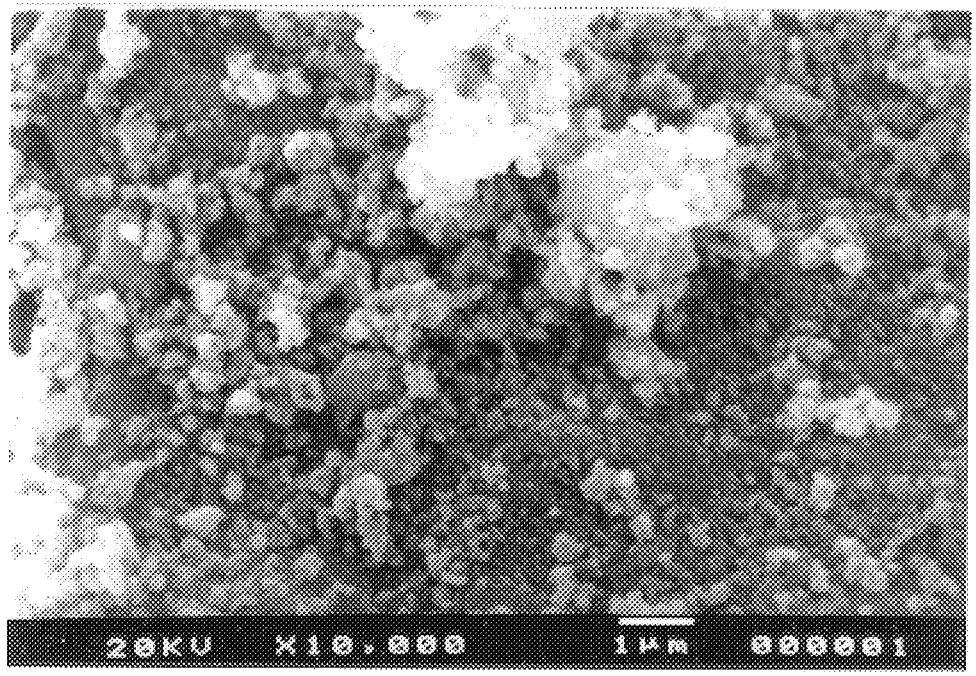
FIG. 5 is a SEM photograph showing the average particle size of the spinel obtained at 450° C.

From the results shown in FIG. 4 and FIG. 5, it can be seen that the material (c) prepared at 450° C. is porous with the presence of small particle averaging 0.2 μm in a diameter. However, in the material (b) prepared at 750° C., most of the particles are coagulating forming thus a block of grains averaging over 20 μm in diameter. Moreover, when the surface areas of the active materials (b) and (c) were measured by means of BET method, the obtained results were 4.84 m$^2$/g as a surface area for the material (b), and a much higher value of 36.46 m$^2$/g as a surface area for the material (c).

From the above results, it can be seen that the above effects shown by mixing manganese dioxide powder with lithium carbonate powder and pressurizing the resulting mixture become more effective when the heat treatment is carried out at a low temperature such as 450° C. Although the applied pressure was adjusted to 1000 kg/cm$^2$ in this example, the above effects shown by pressurizing are also exhibited when the pressure is at least 300 kg/cm$^2$. The more the mixture is pressurized, the better the effects become.

The effect shown by repressurizing and reheating the pulverized obtained spinel material after the first heat treatment using the same thermal condition was also examined.

The heating temperature of the first heat treatment was adjusted to 450° C., the pressure during the repressurization after the first heat treatment was adjusted to 1000 kg/cm$^2$, and the retreatment using the same condition as the previous one was further conducted on the obtained material for 48 hours in an atmosphere of air. The change of the X-ray diffraction pattern is shown in FIG. 6.

Figure 6:
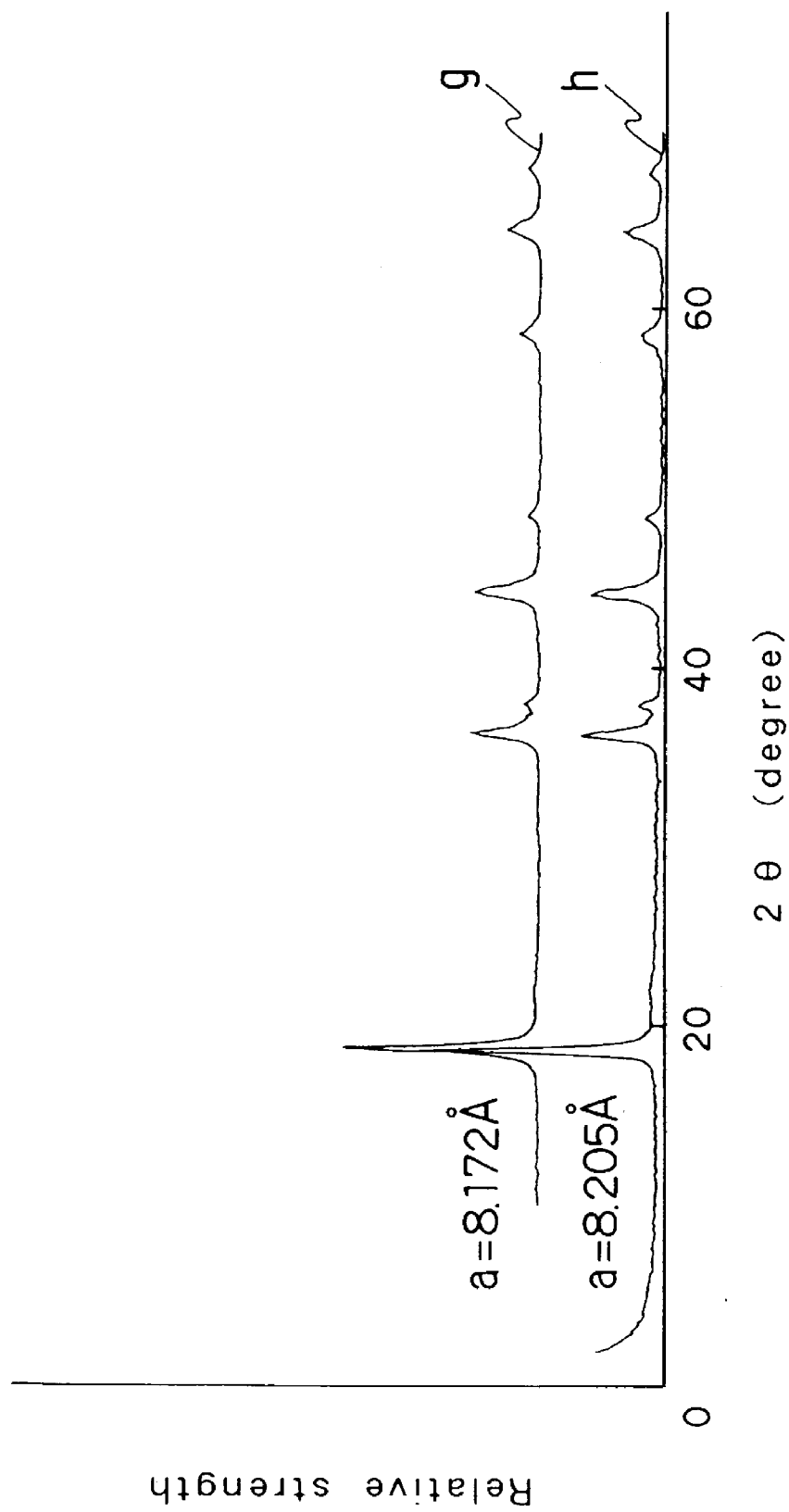
FIG. 6 represents X-ray diffraction patterns of a spinel calcined one time and after being subjected to a second calcination of the present invention.

In FIG. 6, the active material (g) is composite oxide before the above retreatment, and the active material (h) is composite oxide after the above retreatment.

The unit cell parameters of the materials (g) and (h) deduced from the X-ray diffraction analysis in FIG. 6 were 8.172 angstrom and 8.205 angstrom, respectively.

Figure 7:
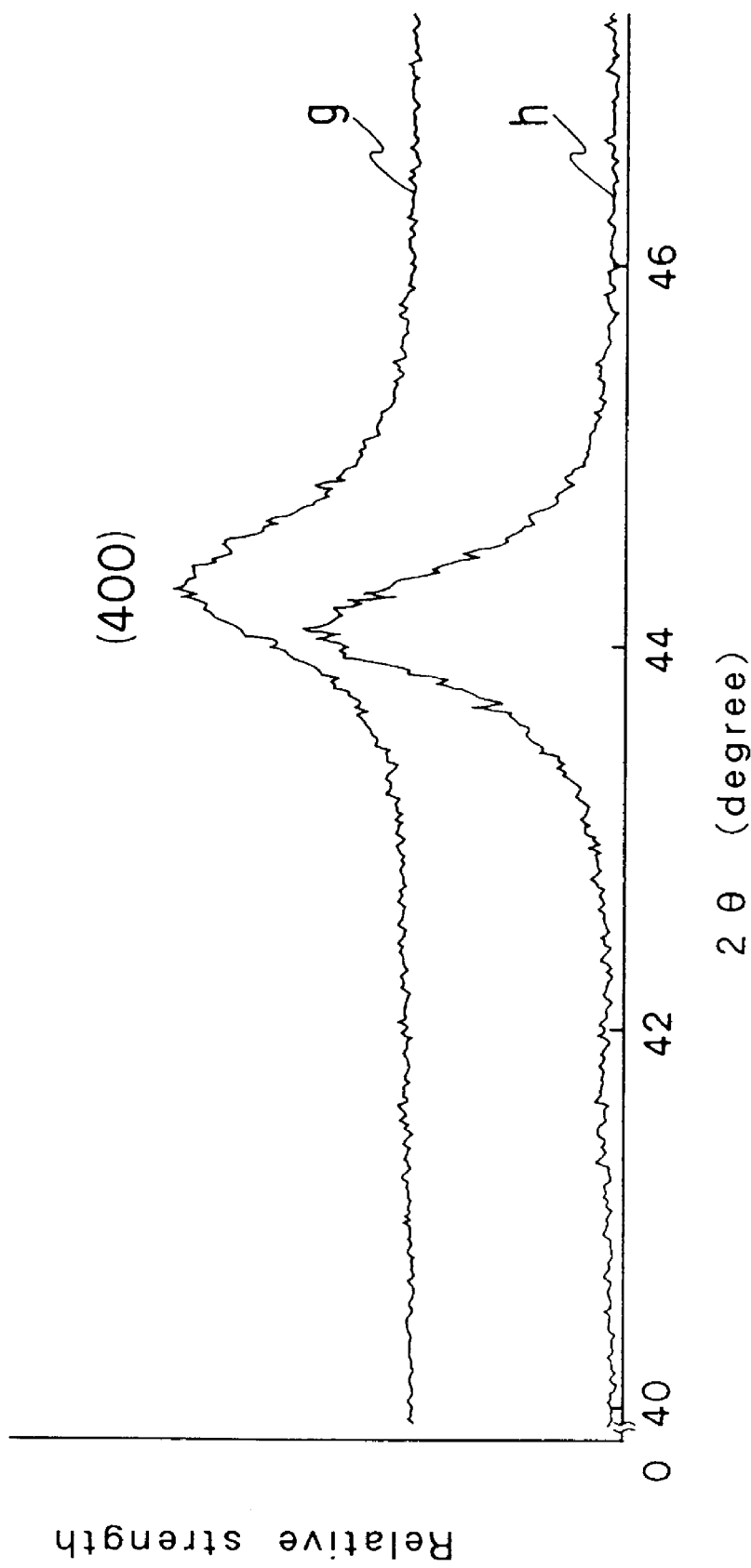
FIG. 7 is a zoom of the X-ray diffraction patterns of FIG. 6 at the portion corresponding to the peak (400).

The zoom of the X-ray diffraction patterns at the area corresponding to the peak (400) is shown in FIG. 7.

As is clear from the results shown in FIG. 7, it can be seen that the peak showing the lithium-manganese composite oxide (h) distinctly shifted toward lower angles after the above retreatment. Therefore, it is assumed that the obtained lithium-manganese composite oxide tends to become more stoichiometric (the lattice constant of the stoichiometric lithium-manganese composite oxide being 8.231 angstrom) by repressurization and retreatment processes.

Also, the composition of the lithium-manganese composite oxide (g) before retreatment was determined based on the result of the quantitative analysis in accordance with ion chromatography and atomic absorption, and an observed low unit cell parameter. As a result, it was ascertained that the composition could be represented by the following formula:

$$LiMn_2O_{4+\epsilon}$$

wherein $\epsilon$ changes depending on its producing conditions and satisfies $0<\epsilon<0.5$. Therefore, when the lithium-manganese composite oxide is prepared at 450° C., the obtained material (g) is an oxygen-defect type spinel.

Using the lithium-manganese composite oxide (h) which was subjected to a retreatment process, a corresponding positive electrode (H) was prepared using the same process as in the case of the above electrodes (A), (B) and (C). Also, the testing condition of the cell using the electrode (H) was similar to that applied to the electrodes (A), (B) and (C).

Figure 8:
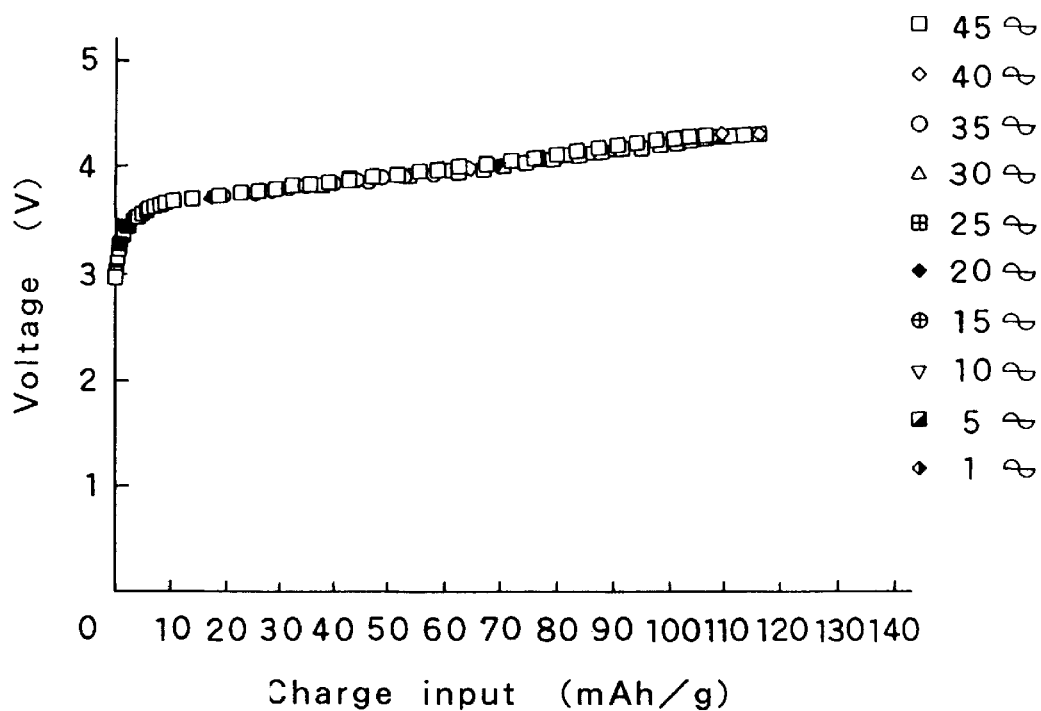
FIG. 8 is a graph showing the charge capacity versus the voltage of an oxygen defect spinel prepared at 450° C.
Figure 9:
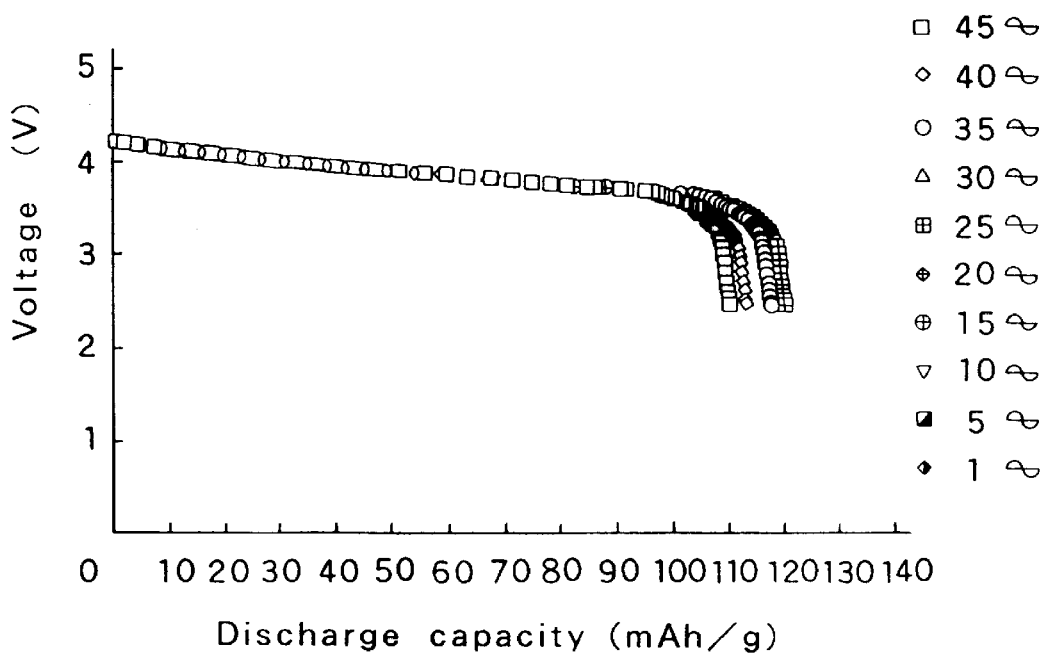
FIG. 9 is a graph showing the discharge capacity versus the voltage of an oxygen defect spinel prepared at 450° C.

The charge and discharge characteristics of the positive electrode (H) are shown in FIG. 8 and FIG. 9, respectively.

Figure 10:
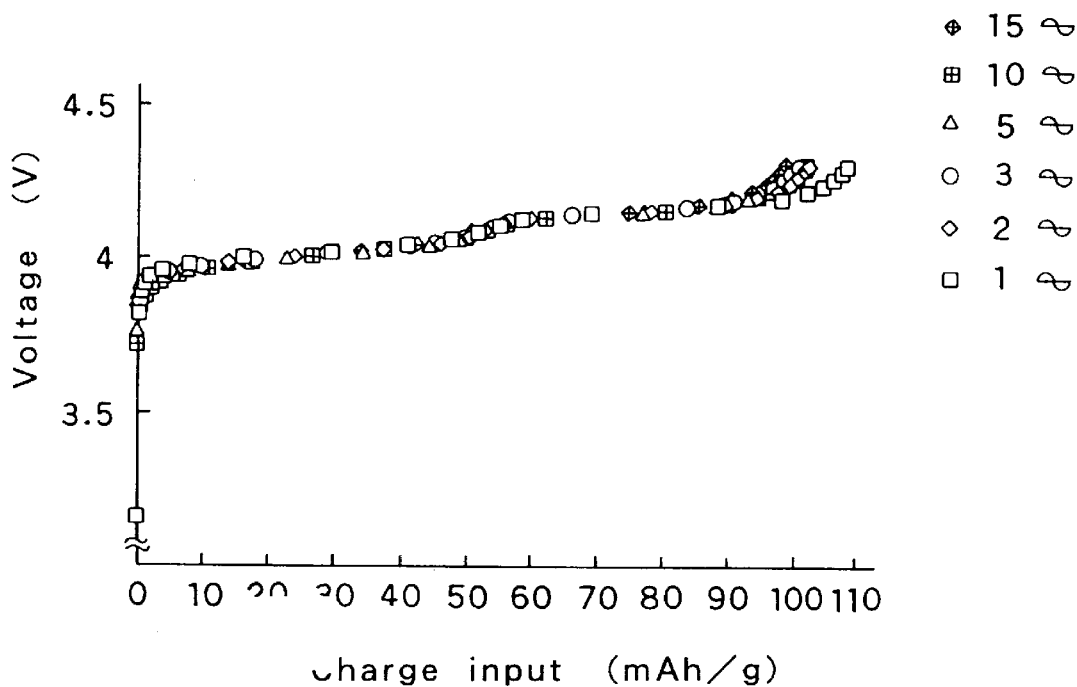
FIG. 10 is a graph showing the charge capacity versus the voltage of a stoichiometric spinel prepared at 750° C.
Figure 11:
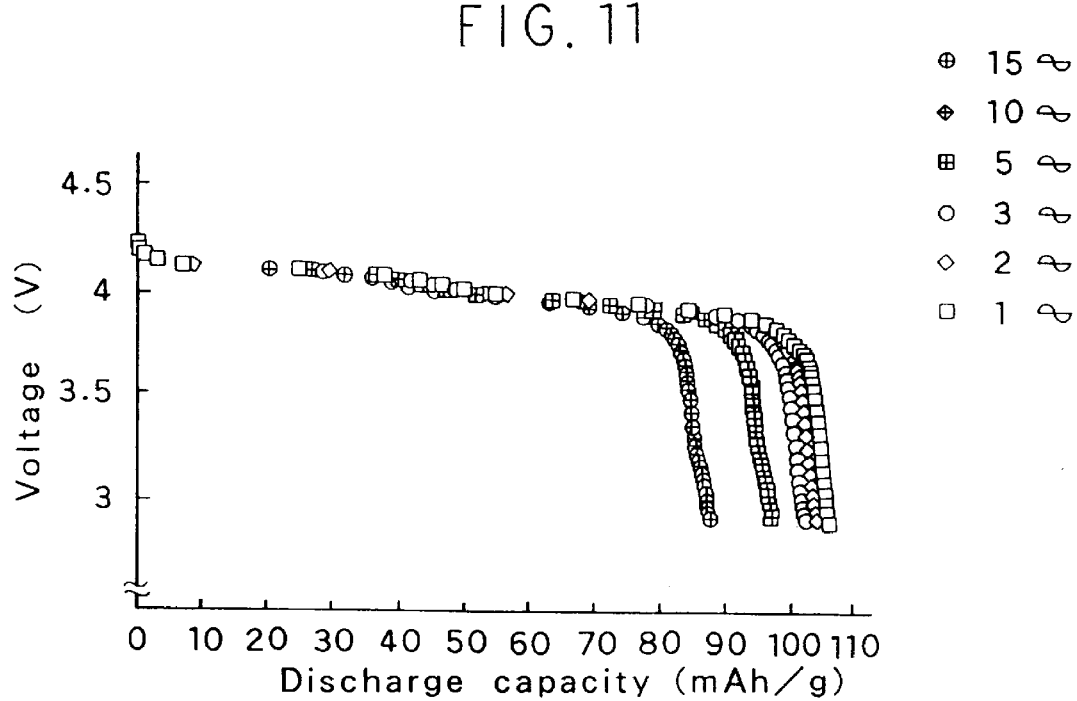
FIG. 11 is a graph showing the discharge capacity versus the voltage of a stoichiometric spinel prepared at 750° C.

As a reference material for comparison, the charge and discharge characteristics of the positive electrode (B) prepared at 750° C. are shown in FIG. 10 and FIG. 11, respectively.

The positive electrode (H) presents one continuous charging and discharging characteristic with a monotonous variation of the potential with the capacity. In contrast, the positive electrode (B) prepared at 750° C. shows two plateaus at different voltages in the charge and discharge curves, so does the electrode (E) prepared by the conventional way which shows more distinctly two charge and discharge plateaus in the vicinity of 4.1 V (vs. Li/Li$^+$) and 3.9 (vs. Li/Li$^+$), From these facts, an important conclusion can be drawn. That is, when the amount of lithium contained in lithium carbonate powder is adjusted to 1 mole per 2 moles of manganese contained in manganese dioxide powder, and after pressurizing and heating the mixture thereof at a low temperature such as about 200° C. to about 650° C., a single phase-containing lithium manganese composite oxide having an oxygen-defect type spinel is formed, and the cell in which the composite oxide is used as an active material shows excellent electrochemical characteristics. The lithium-manganese composite oxide having an oxygen-defect type spinel structure shows very limited loss of the capacity upon cycling in comparison with the stoichiometric spinel having a unit cell parameter of 8.224 angstrom or 8.232 angstrom prepared at 750° C. or 850° C., respectively, and from this fact, it can be concluded that the above composite oxide is suitable for use as an active material for secondary lithium cells.

Furthermore, a positive electrode made of lithium-manganese composite oxide having an oxygen-defect type spinel structure shows different charge and discharge characteristics from the conventional lithium-manganese composite oxide having a stoichiometric spinel structure, and also exhibits not two plateaus but one continuous plateau during charging and discharging processes. This means that a cell showing a smaller change of load can be produced in comparison with a conventional lithium-manganese composite oxide having a spinel structure.

EXAMPLE 2

After chemically prepared manganese dioxide powder having an average particle diameter of 5 μm was mixed with lithium nitrate powder having an average particle diameter of 10 μm in a 2:1 molar ratio of manganese dioxide to lithium nitrate, and after a pressure of 1000 kg/cm$^2$ was applied to the resulting mixture, the mixture was preheated at 350° C. for 6 hours, and then heated at 750° C. or 450° C. for 92 hours in an atmosphere of air before being cooled down to room temperature and pulverized to give a lithium-manganese composite oxide of the present invention.

Then, an electrode was made by mixing 87% by weight of the lithium-manganese composite oxide as the active material, 5% by weight of carbon black as the electric conductor, 5% by weight of polyvinylidene fluoride as the binder and 3% by weight of N-methyl-2-pyrrolidone in a dry chamber to obtain paste. The paste was coated on a titanium net which serves a current collector and then dried at 80° C. for 1 hour to give a positive electrode material having a length of 25 mm, a width of 25 mm and a thickness of 0.25 mm (content of the lithium-manganese composite oxide: 91 mg, theoretical capacity: 13.5 mAh).

A test cell was constructed using a glass cell type comprising the active material as the positive electrode, a lithium metal plate as a counter electrode, a lithium reference material and 50 ml of electrolyte composed of 1M of lithium perchlorate dissolved in ethylene carbonate and diethyl carbonate solvents in a volume ratio of 1:1. A cycle test was conducted by charging the test cell up to 4.3 V at a current density of 0.5 mA/cm$^2$ at room temperature and then discharging it down to 2.5 V at the same current density of 0.5 mA/cm$^2$.

There is a necessity to carry out the reaction under the condition that the heating temperature during preheat treatment is within the range of the melting temperature of LiNO$_3$ of 261° C. and the decomposition temperature of LiNO$_3$ of 600° C. The preheating process is advantageous because LiNO$_3$ melts and diffuses through the porous chemically prepared manganese dioxide including thus a smooth reaction. For instance, when a mixture of manganese oxide powder and lithium nitrate powder was preheated at 350° C. and continuously heated at 700° C., the resulting product shows a very high discharge capacity of 140 mAh/g. However, the material contains some impurities related to Mn$_2$O$_3$. The amount of the impurities is increased when lithium nitrate is used instead of lithium carbonate.

Hereupon, a resulting lithium-manganese composite oxide was examined by changing the ratio between the manganese dioxide powder and the lithium nitrate powder. As a result, it has been found out that the formation of Mn$_2$O$_3$ impurities can be restrained when the amount of lithium to manganese is adjusted to less than the stoichiometric ratio. In another word is to prepare a spinel material with lithium deficiency.

Lithium-manganese composite oxide was obtained in the same manner as described above except that the molar ratio between manganese dioxide powder and lithium nitrate powder was adjusted to (2:0.95) or (2:0.9) in Example 2.

Figure 12:
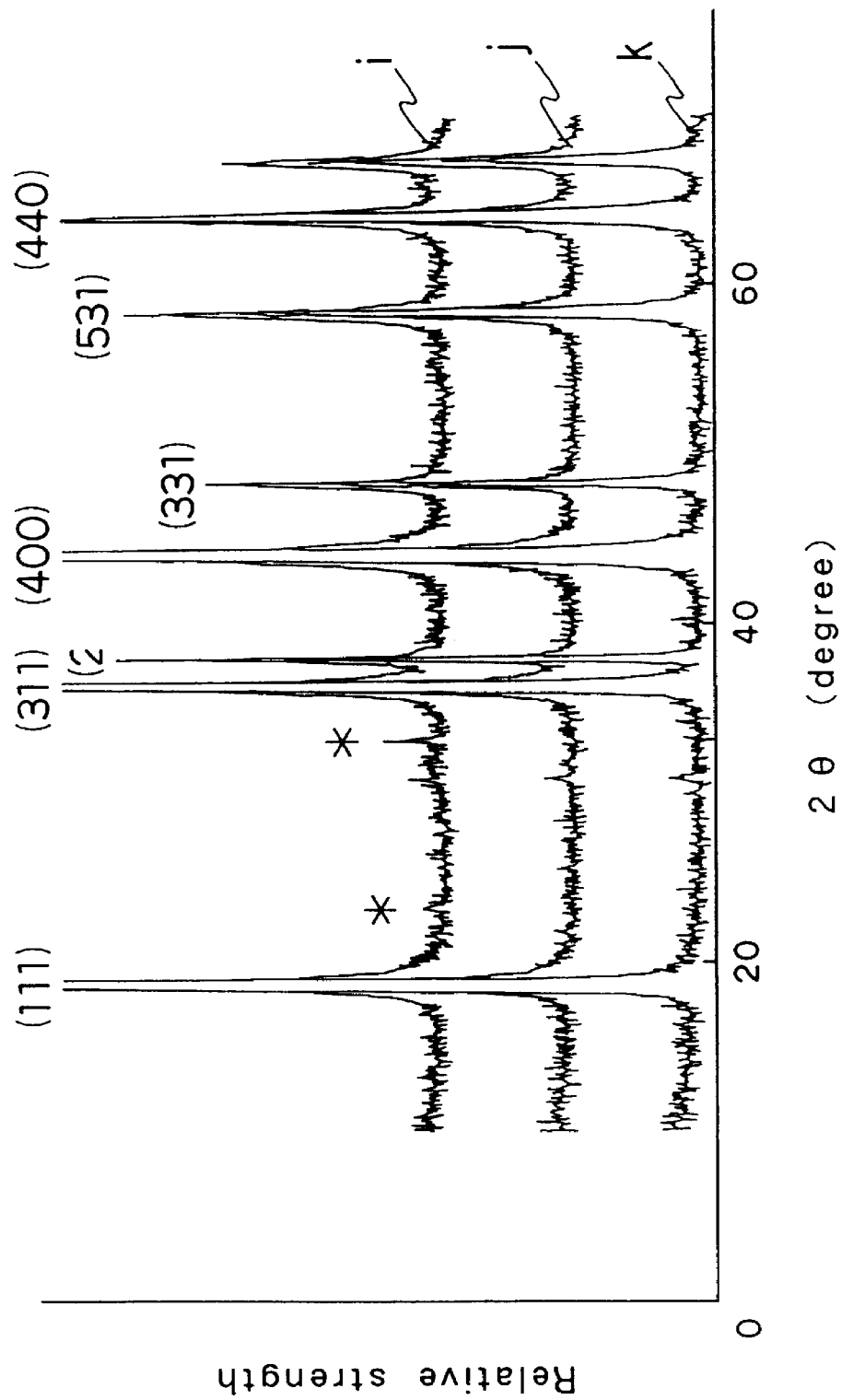
FIG. 12 is an X-ray diffraction pattern of a lithium-manganese composite oxide $LiMn_2O_4$, $Li_{0.95}Mn_2O_4$ or $Li_{0.9}Mn_2O_4$ prepared at 700° C.

The X-ray diffraction patterns of the obtained lithium-manganese composite oxides prepared at 700° C. are shown in FIG. 12.

In FIG. 12, the obtained lithium-manganese composite oxides of LiMn$_2$O$_4$, Li$_{0.95}$Mn$_2$O$_4$ and Li$_{0.9}$Mn$_2$O$_4$ correspond to (i), (j) and (k) patterns, respectively.

From the results shown in FIG. 12, it can be seen that the formation of Mn$_2$O$_3$ impurities, marked by (*) in the diffraction patterns, is ascertained in LiMn$_2$O$_4$, but suppressed when preparing a lithium defect spinel with Li$_{0.95}$Mn$_2$O$_4$ and Li$_{0.9}$Mn$_2$O$_4$ compositions.

As a result, the investigation of the charge and discharge characteristics of the obtained pure lithium defect spinel material without $Mn_2O_3$ contamination, shows a very good cyclic reversibility and a much limited loss in the discharge capacity in comparison with the stoichiometric $LiMn_2O_4$.

It is recognized that impurities of $Mn_2O_3$ are also generated in the lithium-manganese composite oxide obtained in Example 2 in which the molar ratio of manganese dioxide powder to lithium nitrate powder is 2:0.9 specially when the material is prepared at a temperature of 450° C. This recognition is different from that as to the lithium-manganese composite oxide which is prepared at a temperature of 700° C.

To restrain the formation of $Mn_2O_3$, it is effective to carry out the repressurization and reheating of the above material. The results are shown in FIG. 13.

Figure 13:
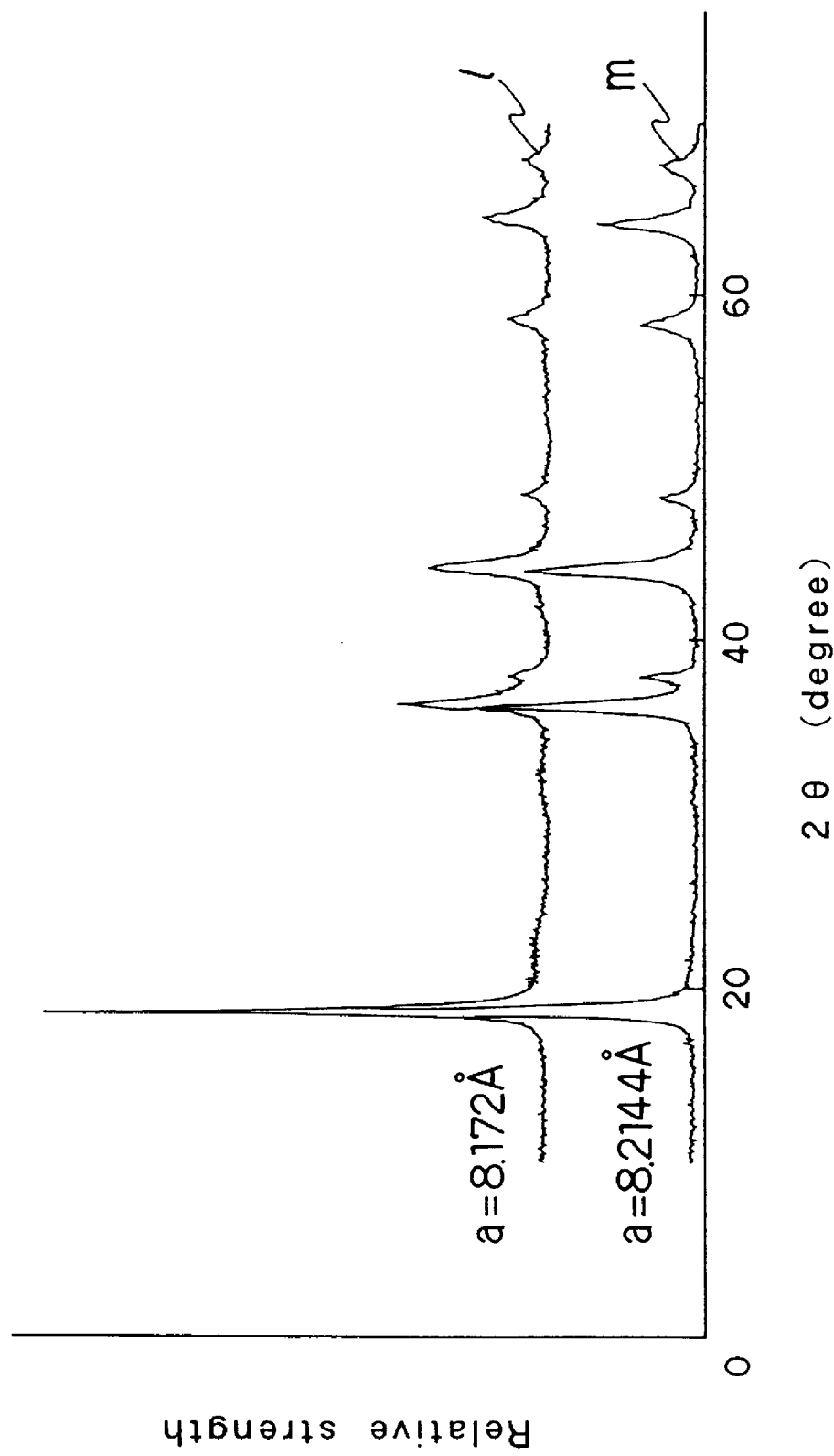
FIG. 13 is an X-ray diffraction pattern of a lithium-manganese composite oxide $LiMn_2O_4$ prepared at 450° C.

In FIG. 13, the pattern denoted by (1) corresponds to the lithium-manganese composite oxide of a composition of $Li_{0.9}Mn_2O_4$ prepared at 450° C. before the repressurization and reheating, and the pattern (m) corresponds to the lithium-manganese composite oxide after repressurizing and then reheating the material at the same conditions as the first treatment.

When repressurization and then reheating at 450° C. are carried out, it can be seen that a diffraction peak based upon $Mn_2O_3$ disappears.

Figure 14:
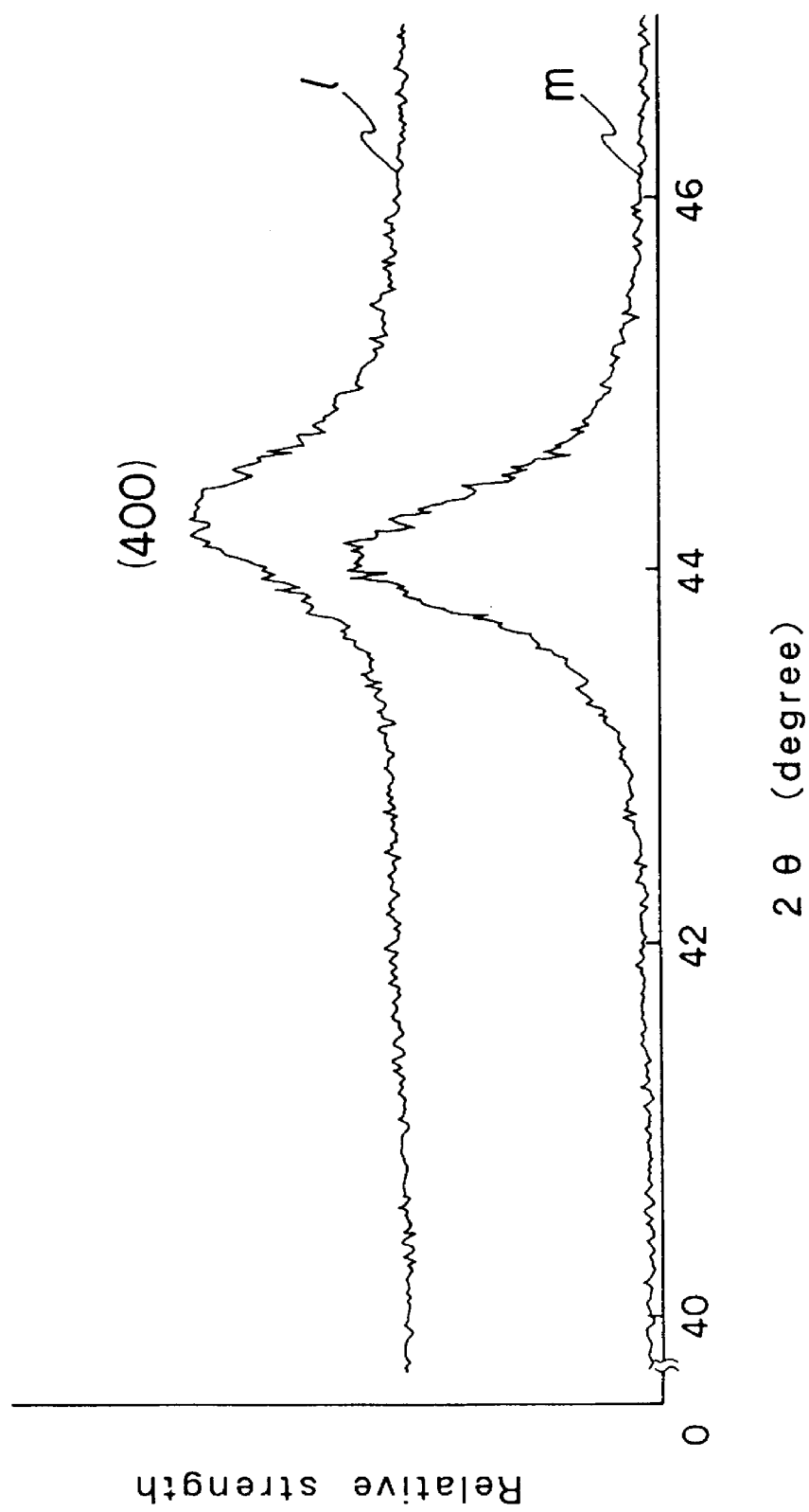
FIG. 14 is a zoom of the X-ray diffraction pattern of FIG. 13 at the portion corresponding to the peak (400).

Also, the zoom of the diffraction peak at the portion corresponding to the plane (400) in FIG. 13 is shown in FIG. 14.

As is clear from the results shown in FIG. 14, it can be seen that the peak is shifted toward lower angles when carrying out the retreatment process indicating that the composition of lithium-manganese composite oxide is shifted toward a more stoichiometric one. In addition, the observed peak in the patterns are very broad revealing that the material has a large surface area and therefore small particles, thereby, the decrease of the discharge capacity upon cycling is very limited.

Furthermore, a process comprising chemically extracting lithium from lithium-manganese composite oxide prepared with nitric acid or the like, and then incorporating back chemically the lithium in the composite oxide with LiI or the like at 80° C. was carried out. As a result, a stoichiometric spinel with a uniform phase was obtained and the electrochemical activity of the obtained material was heightened.

EXAMPLE 3

After 9 g of manganese (II) acetate and 2.532 g of lithium nitrate were dissolved in 75 mg and 50 mg of distilled water, respectively, the resulting solutions were mixed together with the addition of gelatin. Continuously, 30 mg of aqueous ammonia having a concentration of 25% was added to the resulting mixture to give sol. After the sol was dried under vacuum at 90° C., to give paste, the paste was coated on a titanium foil and was heated at 250° C. for 40 hours in an atmosphere of air. After cooling down to room temperature, the obtained material was pulverized to give a lithium-manganese composite oxide.

Then, the obtained material was made by mixing 87% by weight of the lithium-manganese composite oxide as the active material, 5% by weight of carbon black as the electric conductor, 5% by weight of polyvinylidene fluoride as the binder and 3% by weight of N-methyl-2-pyrrolidone in a dry chamber to obtain paste. The paste was coated on a titanium plate which serves a current collector and then dried at 80° C. for 1 hour to give a positive electrode material having a length of 25 mm, a width of 25 mm and a thickness of 0.25 mm (content of the lithium-manganese composite oxide: 91 mg, theoretical capacity: 13.5 mAh).

A test cell was constructed using a glass cell type comprising the active material as positive electrode, a lithium metal plate as a counter electrode, a lithium reference and 50 ml of electrolyte composed of 1M of lithium perchlorate dissolved in ethylene carbonate and diethyl carbonate solvents in a volume ratio of 1:1. A cycle test was conducted by charging the test cell up to 4.3 V at a current density of 0.5 mA/cm$^2$ at room temperature and then discharging it down to 2.5 V at the same current density of 0.5 mA/cm$^2$.

Figure 15:
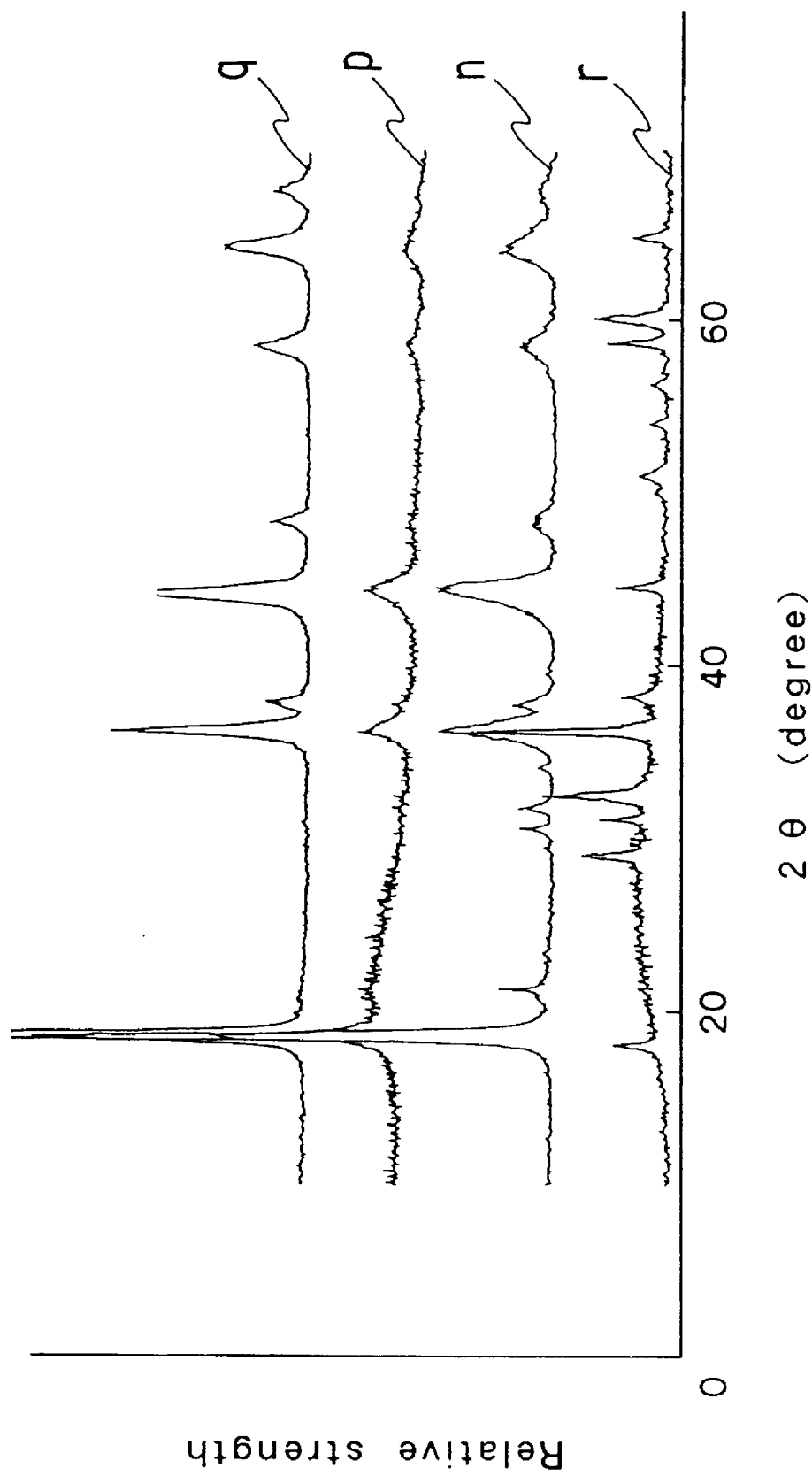
FIG. 15 represents the X-ray diffraction patterns of lithium-manganese composite oxides prepared by using different amount of gelatin.

A product was prepared in the same manner as in the above-mentioned process except that different amounts of gelatin were used, and the X-ray diffraction analysis was carried out. The X-ray diffraction patterns are shown in FIG. 15. The pattern denoted as (r) corresponds to the obtained material without previously using gelatin as a stabilizing agent, the pattern (n) corresponds to the material after using 4% of gelatin by total weight. The pattern (p) corresponds to the material after using 30% of gelatin by total weight, and the pattern (q) corresponds to the material after using 14% of gelatin by total weight, based upon the total amounts of manganese acetate, lithium nitrate and gelatin.

From the diffraction patterns (r) where gelatin is not used, the formation of $Mn_2O_3$ alone is ascertained, and it is difficult to obtain lithium-manganese composite oxide in this case.

From the diffraction patterns (n) where the amount of gelatin is 4% by total weight, a mixed product of lithium-manganese composite oxide, $Mn_2O_3$ and $Li_2MnO_3$ is obtained.

From the diffraction pattern of (p) where the amount of gelatin is as much as 30% by total weight, a lithium-manganese composite oxide mixed with an amorphous phase is obtained.

From the diffraction pattern of (q) in which the amount of gelatin is 14% by weight, a lithium-manganese composite oxide of $LiMn_2O_4$ without impurities is obtained.

Thus, a suitable amount of gelatin of 7 to 20% by weight based upon the total amounts of manganese acetate, a lithium salt and gelatin, is needed to prepare a lithium-manganese composite oxide.

It is unclear but thought to be that the function and effects exhibited by the gelatin are based upon the prevention of the formation of $Mn(OH)_2$ during the dissolution of manganese organic salt.

Figure 16:
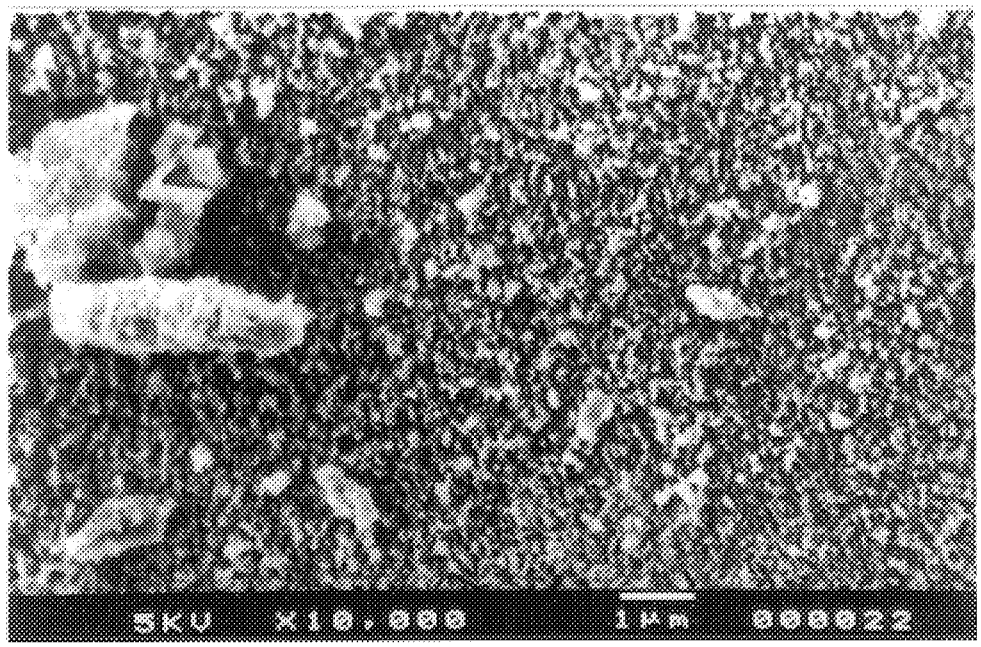
FIG. 16 is a SEM photograph showing particles of a spinel positive material of the present invention.
Figure 17:
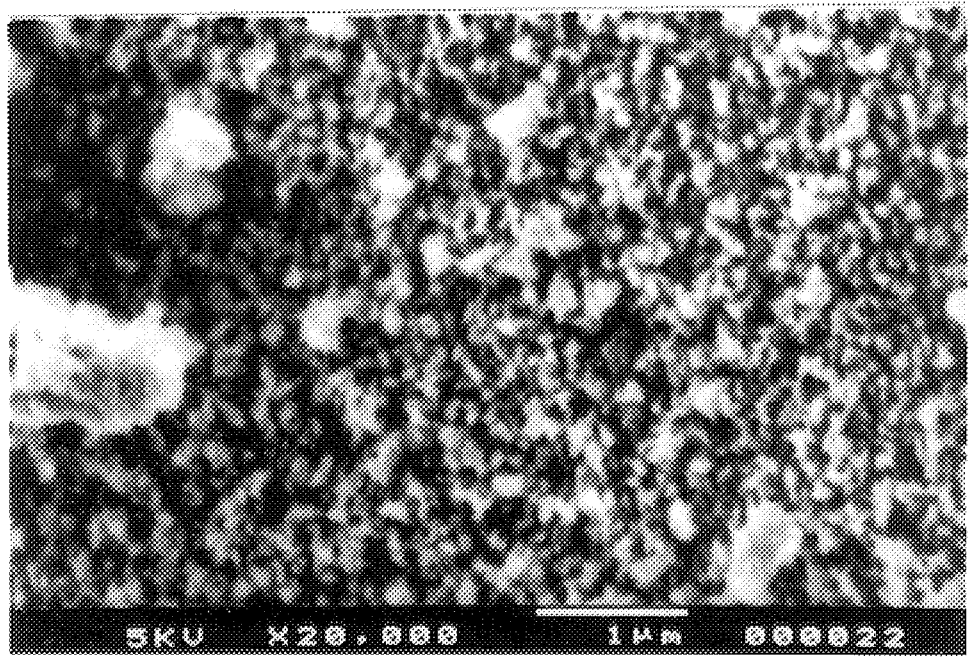
FIG. 17 is a SEM photograph showing particles of a spinel positive material of the present invention.

The scanning electron microscopy (SEM) photographs of the lithium-manganese composite oxide where 14% by weight of gelatin was used are shown in FIG. 16 and FIG. 17. From the results shown in FIG. 16 and FIG. 17, it can be seen that the lithium-manganese composite oxide is extremely porous with the presence of very small particles having an average diameter of about 0.1 μm.

Also, when the surface area of the lithium-manganese composite oxide was measured by means of BET method, the composite oxide has an extremely large surface area of 48 m$^2$/g. As a reference, the surface area of lithium-manganese composite oxide prepared by thee conventional method at a temperature of 750° C. according to the reaction formula (1) was measured and found to be only 4.84 m$^2$/g. From this fact, it can be seen that the lithium-manganese composite oxide according to the present invention has a surface area of about 10 times greater than that of the conventional composite oxide.

Figure 18:
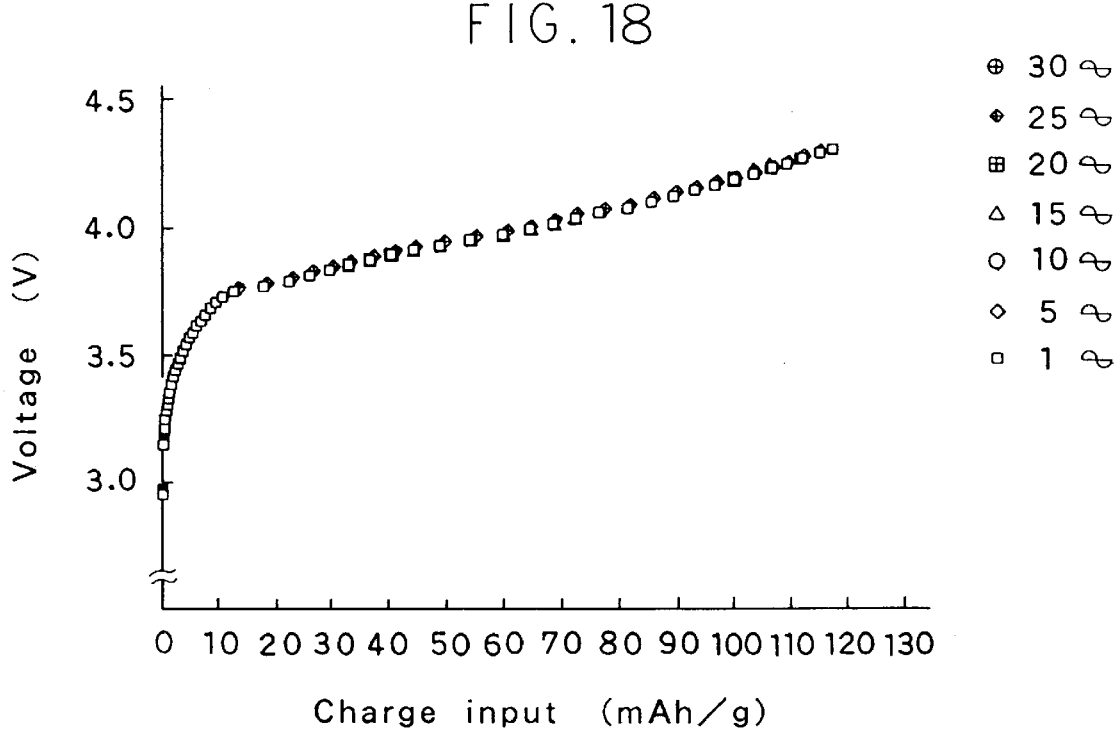
FIG. 18 is a graph showing the charge capacity versus the voltage of a spinel positive material.
Figure 19:
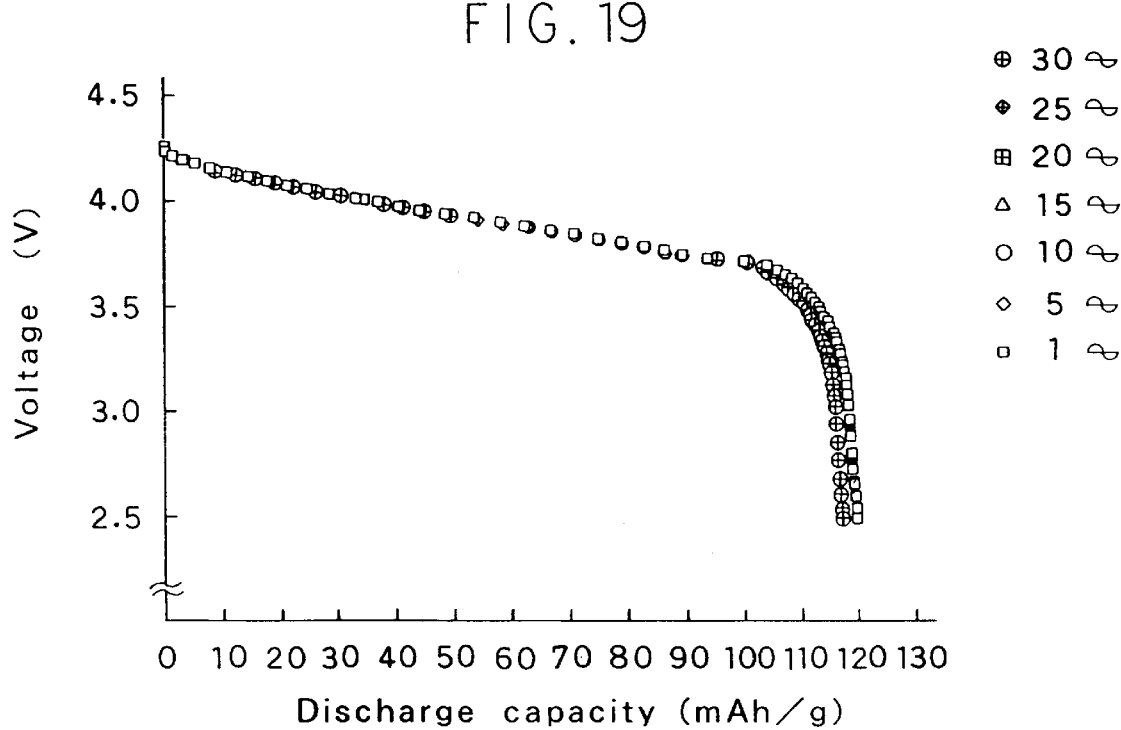
FIG. 19 is a graph showing the discharge capacity versus the voltage of a spinel positive material.

The charge and discharge characteristics of the positive electrode comprising a lithium-manganese composite oxide prepared using 14% of gelatin by total weight of the present invention are shown in FIG. 18 and FIG. 19.

From the results shown in FIG. 18 and FIG. 19, it can be seen that the initial electric capacity of the cell is 120 mAh/g and that the decrease in the electric capacity of the cell is hardly observed after 30 cycles.

Furthermore, the positive electrode made of lithium-manganese composite oxide of the present invention which has an oxygen defect spinel structure type shows charge and discharge characteristics different from a conventional lithium-manganese composite oxide having a stoichiometric spinel structure. In fact, the electrode made of the oxygen defect lithium-manganese composite oxide of the present invention exhibits one monotonous variation without flexion of the potential during the charge and discharge processes, whereas the conventional lithium-manganese composite oxide presents two distinct plateaus at different voltage during the charge and discharge. Accordingly, a cell showing a smaller change of load can be produced using the oxygen defect lithium-manganese composite oxide of the present invention in comparison with a cell in which a conventional stoichiometric lithium-manganese composite oxide is used.

EXAMPLE 4

After 4 g of manganese (II) acetate and 1.125 g of lithium nitrate were dissolved in 50 mg of ethyl alcohol, respectively, the resulting solutions were mixed together with the addition of 0.03 g of carbon powder. The mixed solution was violently stirred and 30 ml of aqueous ammonia having a concentration of 25% was then added to the solution to give sol. After the sol was dried at 50° C. to give a gel in the form of paste, the paste was coated on a titanium foil and heated at 250° C. for about 60 hours in an atmosphere of air, and then cooled down to room temperature and pulverized to give lithium-manganese composite oxide.

Then, an electrode was made by mixing 87% by weight of the lithium-manganese composite oxide as the active material, 5% by weight of carbon black as the electric conductor, 5% by weight of polyvinylidene fluoride as the binder and 3% by weight of N-methyl-2-pyrrolidone in a dry chamber to obtain paste. The paste was coated on a titanium plate which serves as a current collector and then dried at 80° C. for 1 hour to give a positive electrode material having a length of 25 mm, a width of 25 mm and a thickness of 0.25 mm (content of the lithium-manganese composite oxide: 91 mg, theoretical capacity: 13.5 mAh).

A test cell was constructed using a glass cell type comprising the active material as a positive electrode, a lithium metal plate as a counter electrode, a lithium reference and 50 ml of electrolyte composed of 1M of lithium perchlorate dissolved in ethylene carbonate and diethyl carbonate solvents in a volume ratio of 1:1. A cycle test was conducted by charging the test cell up to 4.3 V at a current density of 0.5 mA/cm$^2$ at room temperature and then discharging it down to 2.5 V at the same current density of 0.5 mA/cm$^2$.

An X-ray diffraction analysis of the obtained lithium-manganese composite oxide was carried out. The results are shown in FIG. 20.

Figure 20:
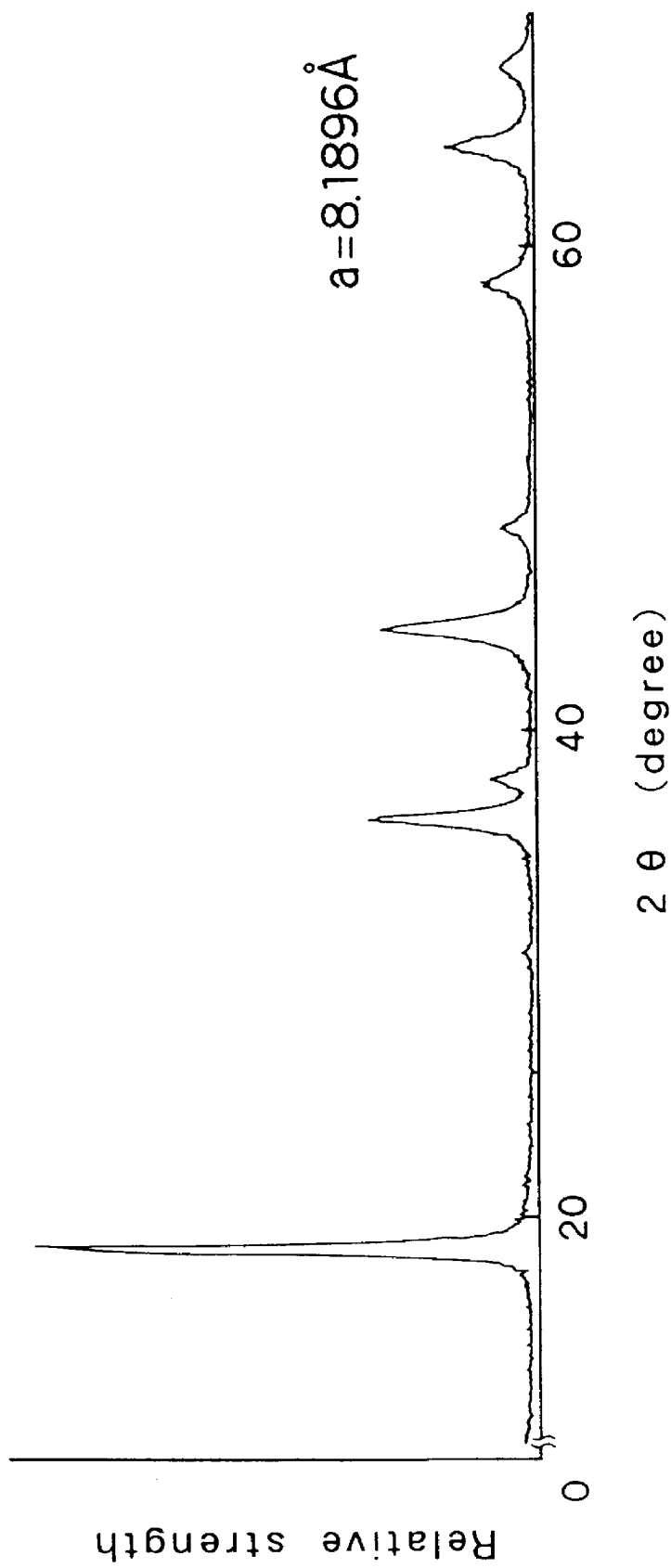
FIG. 20 is an X-ray diffraction pattern of a lithium-manganese composite oxide in which manganese acetate is used of the present invention.

From the results shown in FIG. 20, it can be seen that the lithium-manganese composite oxide of $LiMn_2O_4$ where no impurity is detected can be prepared in the same manner as in the case of using 14% by weight of gelatin and water as a solvent in Example 4. The lattice constant of this active material is 8.1896 angstrom which is lower than that of the stoichiometric spinel (8.231 angstrom) which is prepared by the conventional methods. Since both ion chromatography and atomic absorption analysis of the lithium-manganese composite oxide prepared by the above process gives a 1:2 ratio between lithium and manganese, this material is also an oxygen defect spinel material. The investigation of its electrochemical characteristics shows similar performances as the active material prepared by gelatin, that is, the potential of the corresponding electrode varies in a monotonous way without flection during charging and discharging, in addition to the observed good cyclic reversibility.

EXAMPLE 5

After 4 g of manganese (II) acetylacetonate end 0.4768 g of lithium nitrate were dissolved in 150 ml and 50 mg of ethyl alcohol, respectively, the resulting solutions were mixed together with the addition of 0.03 g of carbon powder. The mixed solution was violently stirred and 30 mg of aqueous ammonia having a concentration of 25% was added to the solution to give sol. After the sol was dried at 50° C. to give gel in the form of a paste, the paste was coated on a titanium foil and was heated at 300° C. for 99 hours in an atmosphere of air, and then cooled down to room temperature and pulverized to give a lithium-manganese composite oxide.

Then, an electrode was made by mixing 87% by weight of the lithium-manganese composite oxide as the active material, 5% by weight of carbon black as an electric conductor, 5% by weight of polyvinylidene fluoride as a binder and 3% by weight of N-methyl-2-pyrrolidone in a dry chamber to obtain paste. The paste was coated on a titanium plate which serves as a current collector and then dried at 80° C. for 1 hour to give a positive electrode material having a length of 25 mm, a width of 25 mm and a thickness of 0.25 mm (content of the lithium-manganese composite oxide: 91 mg, theoretical capacity: 13.5 mAh).

A test cell was constructed using a glass cell type comprising the active material as a positive electrode, a lithium metal plate as a counter electrode, a lithium reference and 50 mg of electrolyte composed of 1M of lithium perchlorate dissolved in ethylene carbonate and diethyl carbonate solvents at a volume ratio of 1:1. A cycle test was conducted by charging the test cell up to 4.3 V at a current density of 0.5 mA/cm$^2$ at room temperature and then discharging it down to 2.5 V at the same current density of 0.5 mA/cm$^2$.

Figure 21:
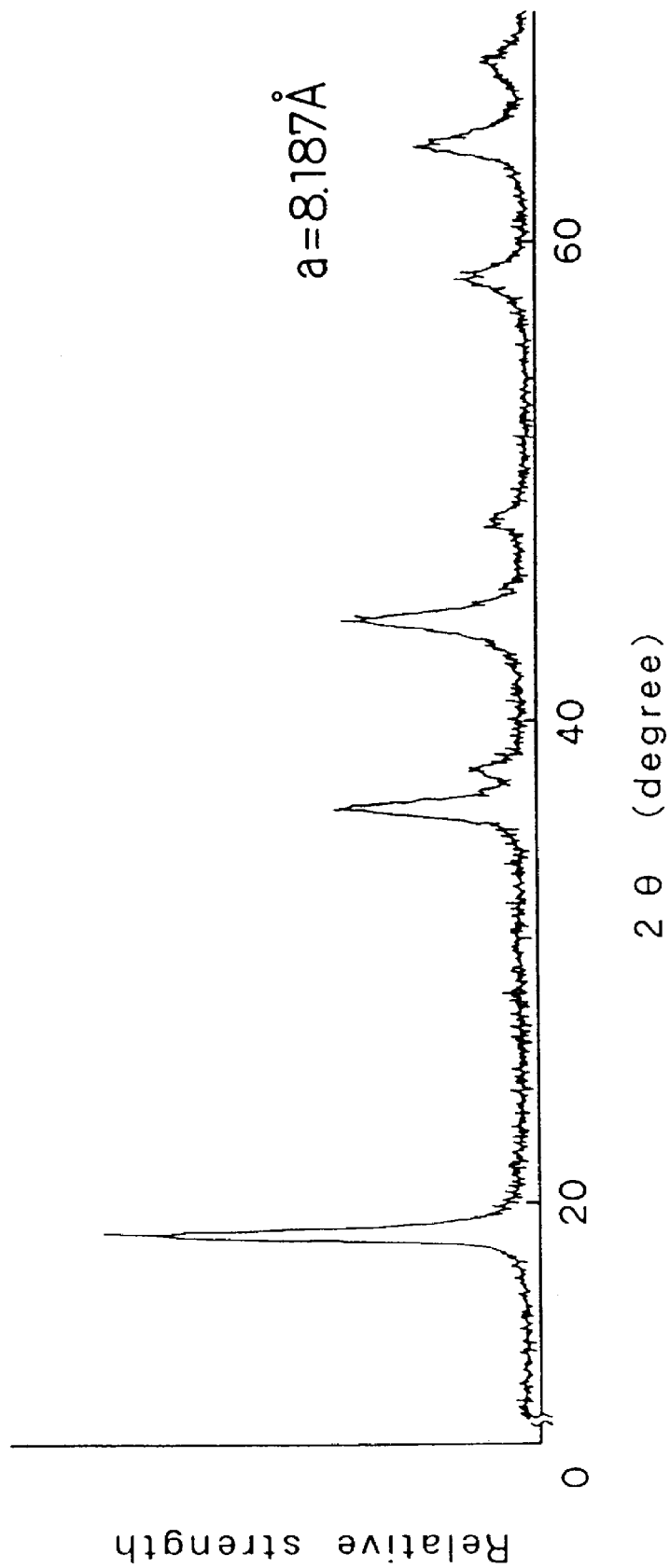
FIG. 21 is an X-ray diffraction pattern of a lithium-manganese composite oxide in which manganese acetylacetonate is used.

In Example 5, a lithium-manganese composite oxide where no impurity is detected could be prepared in the same manner as in Example 4. The X-ray diffraction patterns of this active material are shown in FIG. 21.

The lattice constant of this active material is 8.1870 angstrom which is lower than that of the stoichiometric spinel (8.231 angstrom) which is prepared by the conventional methods. Since both ion chromatography and atomic absorption analysis of the lithium-manganese composite oxide prepared by the above process gives a 1:2 ratio between lithium and manganese, this material is also an oxygen defect spinel material. The investigation of its electrochemical characteristics shows similar performances as the active material prepared in Example 3, that is, the potential of the corresponding electrode varies in a monotonous way without flection during charging and discharging, in addition to the observed good cyclic reversibility.

Also, in order to compare the products according to the present invention with conventional ones, a comparison of the X-ray diffraction patterns of lithium-manganese composite oxide (e) which is obtained at 750° C. by a conventional process in accordance with the reaction (1), the lithium-manganese composite oxide (s) obtained in Example 5 and the lithium-manganese composite oxide (t) obtained by heating at a temperature of 300° C. which is the same as in Example 3, was carried out. The diffraction patterns are shown in FIG. 22.

Figure 22:
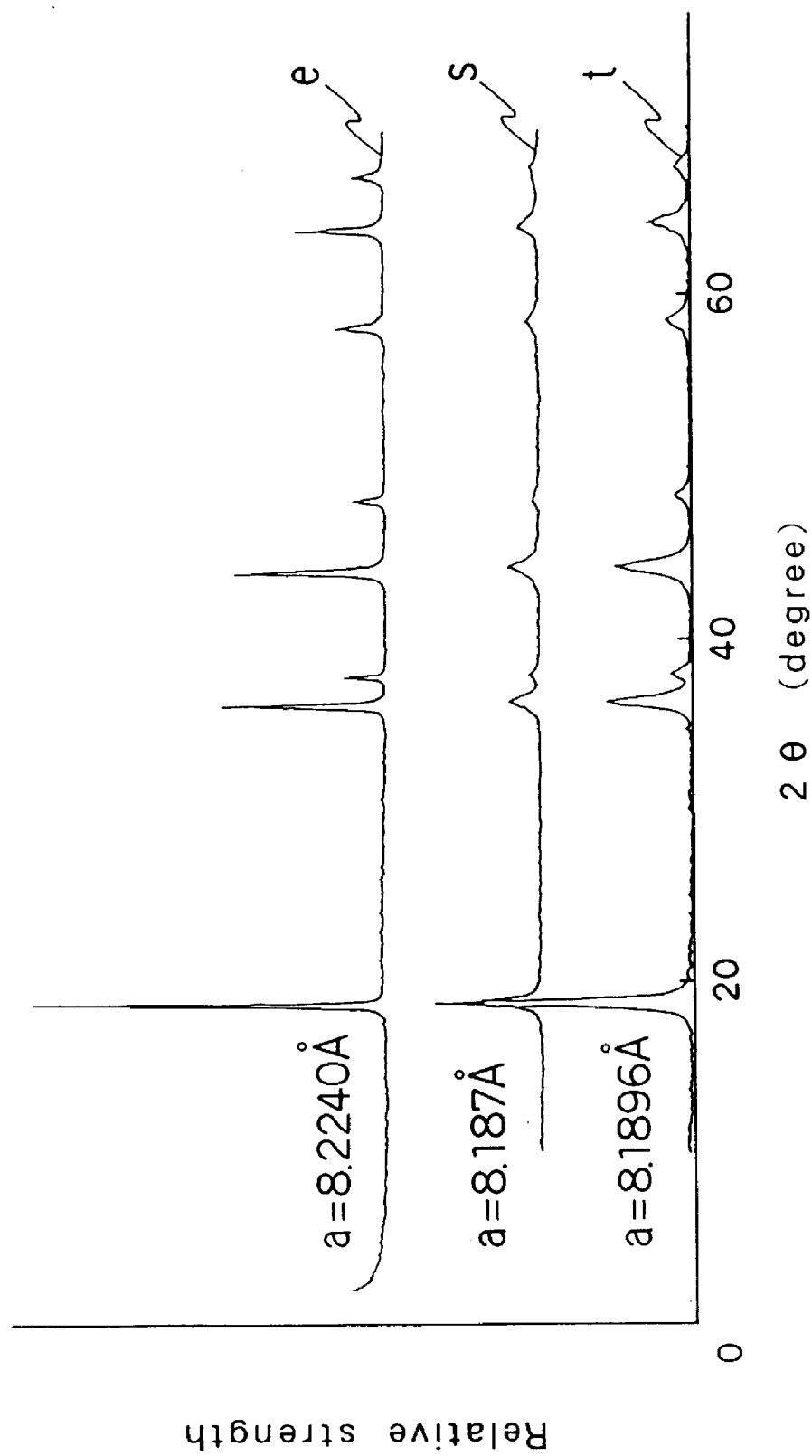
FIG. 22 is an X-ray diffraction pattern of a lithium-manganese composite oxide of the present invention.

As is clear from the results shown in FIG. 22, it can be seen that the shape of the diffraction peaks of the lithium-manganese composite oxides (s) and (t) of the present invention are broader than those of the conventional lithium-manganese composite oxide.

Figure 23:
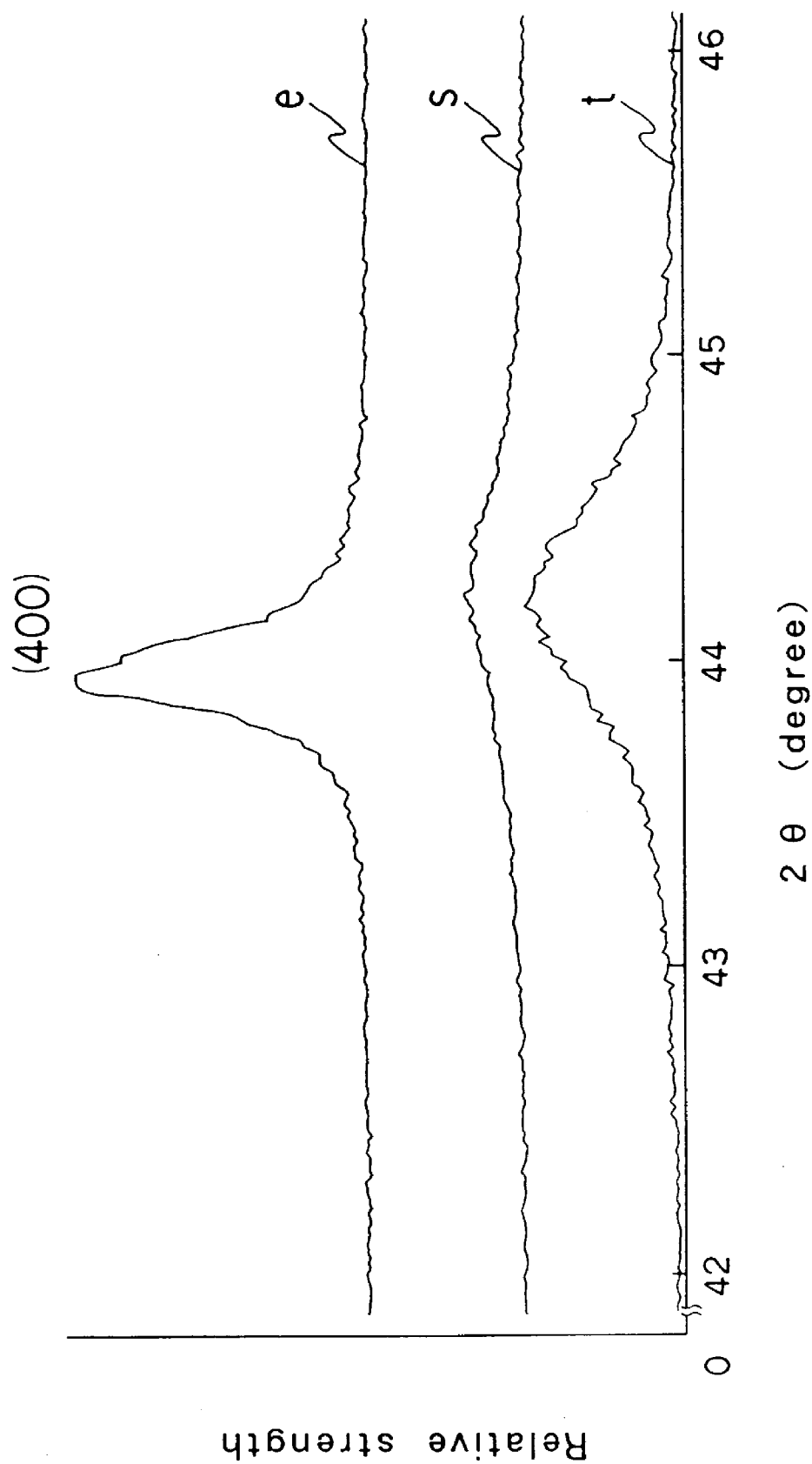
FIG. 23 is a zoom of the X-ray diffraction pattern of FIG. 22 at the portion corresponding to the peak (400).

The zoom of the X-ray diffraction patterns at the portion corresponding to the peak (400) shown in FIG. 22 is shown in FIG. 23.

From the results shown in FIG. 23, it can be seen that the peaks of the conventional lithium-manganese composite oxide (e) are divided into two peaks, indicating the presence of two phases in the conventional material. It should be pointed out that the observed second peak could not be confused with $K\alpha$ 2 peaks since all $K\alpha$ 2 peaks in the patterns were eliminated. On the other hand, from the results shown in FIG. 23, it can be seen that the diffraction peaks of the lithium-manganese composite oxides (s) and (t) are broad, and have symmetrical shapes. Therefore, a uniform phase having a large surface area is formed in this case.

The characteristics of the present invention are summarized as follows:

(1) A positive active material for a non-aqueous cell comprising a lithium-manganese composite oxide having an oxygen-defect type spinel structure.

(2) The positive active material comprising a lithium-manganese composite oxide of the above item (1), wherein the lithium-manganese composite oxide has a lattice constant of 8.17 angstrom to 8.22 angstrom.

(3) The positive active material comprising a lithium-manganese composite oxide of the above item (1), wherein the lithium-manganese composite oxide has a surface area of at least 30 $m^2/g$.

(4) A positive electrode material comprising a lithium-manganese composite oxide showing a monotonous variation of the potential during charging and discharging process.

(5) The positive electrode material of the above item (4) comprising a lithium-manganese composite oxide showing one phase reaction during the intercalation and extraction of lithium upon charging and discharging.

(6) A non-aqueous secondary cell in which a positive active material comprising a lithium-manganese composite oxide having an oxygen-defect spinel structure type is used.

(7) A process for preparing a lithium-manganese composite oxide, comprising mixing manganese oxide with a lithium salt such as lithium carbonate or lithium hydroxide and then pressurizing the mixture at a pressure of at least 300 $kg/cm^2$, heating and pulverizing the mixture.

(8) The process for preparing a lithium-manganese composite oxide of the above item (7), comprising carrying out a repeated repressurization and reheating of the resulting material at least once, previously subjected to one pressurization and one heat treatment.

(9) A process for preparing lithium-manganese composite oxide, comprising mixing manganese dioxide with lithium nitrate so that lithium contained in the lithium nitrate is below 1 mole per 2 moles of manganese contained in manganese dioxide to give a mixture, pressurizing the mixture at a pressure of at least 300 $kg/cm^2$, heating the mixture to the melting point of the lithium nitrate, and then further heating the mixture at a temperature between 300° to 700° C.

(10) A process for preparing lithium-manganese composite oxide, comprising mixing an organic acid salt of manganese such as manganese acetate, manganese formate, manganese lactate, manganese acetylacetonate or manganese citrate and a lithium salt such as $LiNO_3$, lithium acetate, lithium citrate, lithium lactate or lithium formate in an aqueous solution or ethyl/methyl alcohol and then precipitating the sol be adding an aqueous alkaline solution before drying and heating the obtained gel.

(11) The process for preparing a lithium-manganese composite oxide of the above item (10), wherein the sol-stabilizing agent is gelatin or carbon materials.

(12) The process for preparing a lithium-manganese composite oxide of the above item (10), wherein the heating temperature is 200° to 600° C.

(13) A process for preparing a lithium-manganese composite oxide comprising using a sol-gel method of the above item (10) or (11) to give a lithium-manganese composite oxide having a lattice constant of 8.17 angstrom to 8.22 angstrom.

(14) The process for preparing a lithium-manganese composite oxide of the above item (11), wherein the amount of the sol-stabilizing agent gelatin is 7 to 20% by weight per the total amount of manganese acetate, a lithium salt or lithium hydroxide and gelatin.

(15) The process for preparing a lithium-manganese composite oxide of the above item (11), wherein the amount of the sol-stabilizing agent carbon is ranged between 0.1% to 20% by weight per the total amount of manganese acetate, a lithium salt or lithium hydroxide and carbon.

(16) A process for preparing an electrode without a binder comprising a lithium-manganese composite oxide and a conducting material such as carbon materials by coating the paste obtained from the process of the above item (10) on a current collector mesh and heating the whole at 150° to 450° C.

(17) The lithium-manganese composite oxide of the above item (1) prepared from $Li_2CO_3$ or LiOH and manganese dioxide at a temperature between 300° to 600° C. using the process of the above item (7) or (8).

(18) The lithium-manganese composite oxide of the above item (1) prepared from $LiNO_3$ and manganese dioxide at a temperature between 300° to 600° C. using the process of the above item (9).

As mentioned above, a cell having a positive electrode comprising a lithium-manganese composite oxide of the present invention has excellent characteristics with a very limited loss in the electric capacity upon cycling, and a monotonous variation of the potential without flexion indicating the occurrence of one phase reaction during charging and discharging processes.

The lithium-manganese composite oxide of the present invention is highly homogeneous with a little impurities because the preparation processes of the present invention are carried out in a uniform way.

Furthermore, the electrode comprising the lithium-manganese composite oxide of the present invention as an active material, is hardly swollen or shrunk upon charging and discharging.

Accordingly, the positive electrode comprising this active material does not dissolve in the electrolyte as is the case with most of the conventional lithium-manganese composite oxides. Thereby, the cycle life of the material upon charging and discharging can be prolonged.

In addition to the ingredients used in the Examples, other ingredients can be used in the Examples as set forth in the specification to obtain substantially the same results.

What is claimed is:

1. A 4 volt positive electrode for a non-aqueous cell comprising a lithium-manganese composite oxide having an oxygen-defect type spinel structure, said lithium-manganese composite oxide having a lattice constant of 8.17 to 8.22 angstroms.

2. The positive electrode comprising a lithium-manganese composite oxide of claim 1, wherein the lithium-manganese composite oxide has a surface area of at least 30 $m^2/g$.

3. A 4 volt positive electrode comprising a lithium-manganese composite oxide showing a monotonous variation of the potential during charging and discharging process.

4. The positive electrode of claim 3, wherein said lithium-manganese composite oxide shows one phase reaction during intercalation and extraction of lithium upon charging and discharging.

5. A 4 volt positive electrode of claim 1 prepared from $LiCO_3$ or $LiOH$ and manganese dioxide by a process which comprises the steps of pressurizing a mixture of $LiCO_3$ or $LiOH$ and manganese dioxide under a pressure of at least 300 $kg/cm^2$, heating said mixture at a temperature of 300° to 600° C. and pulverizing said mixture.

6. A 4 volt positive electrode of claim 1 prepared from $LiNO_3$ and manganese dioxide by a process which comprises the steps of pressurizing a mixture of $LiNO_3$ and manganese dioxide, heating said mixture at a temperature of 300° to 600° C. and pulverizing said mixture.

* * * * *